(12) United States Patent
Grover et al.

(10) Patent No.: US 7,707,566 B2
(45) Date of Patent: Apr. 27, 2010

(54) SOFTWARE DEVELOPMENT INFRASTRUCTURE

(75) Inventors: Vinod K. Grover, Mercer Island, WA (US); Charles L. Mitchell, Kirkland, WA (US); David Mitford Gillies, Bellevue, WA (US); Mark Leslie Roberts, Clyde Hill, WA (US); Mark Ronald Plesko, Kirkland, WA (US); David Read Tarditi, Jr., Kirkland, WA (US); Andrew James Edwards, Bellevue, WA (US); Julian Burger, Bothell, WA (US); Andrew Edward Ayers, Kirkland, WA (US); Akella V. S. Sastry, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1347 days.

(21) Appl. No.: 10/628,054

(22) Filed: Jul. 25, 2003

(65) Prior Publication Data

US 2004/0268309 A1 Dec. 30, 2004

Related U.S. Application Data

(63) Continuation-in-part of application No. 10/607,591, filed on Jun. 27, 2003, and a continuation-in-part of application No. 10/610,692, filed on Jun. 30, 2003, now Pat. No. 7,559,050, and a continuation-in-part of application No. 10/626,251, filed on Jul. 23, 2003, now Pat. No. 7,305,666, and a continuation-in-part of application No. 10/625,892, filed on Jul. 22, 2003, now Pat. No. 7,146,606, and a continuation-in-part of application No. 10/609,275, filed on Jun. 26, 2003, now Pat. No. 7,120,898.

(51) Int. Cl.
*G06F 9/44* (2006.01)
*G06F 9/45* (2006.01)

(52) U.S. Cl. ........................ 717/148; 717/103; 717/107; 717/120; 717/136

(58) Field of Classification Search ................. 717/140, 717/146
See application file for complete search history.

(56) References Cited

U.S. PATENT DOCUMENTS 4,197,978 A 4/1980 Kasper (Continued)

FOREIGN PATENT DOCUMENTS

EP 0 463 583 1/1992

(Continued)

OTHER PUBLICATIONS

Michael G. Burke et al., "The Jalepeno dynamic optimizing compiler for Java", Jun. 1999, Proceedings of ACM 1999 conference on Java Grande, ISBN: 1-58113-161-5, pp. 129-141.*

(Continued)

*Primary Examiner*—Tuan Q Dam
*Assistant Examiner*—Isaac T Tecklu
(74) *Attorney, Agent, or Firm*—Klarquist Sparkman, LLP

(57) ABSTRACT

A software development architecture is provided for constructing a wide range of software development tools. A software development tool can be created by integrating a specification specifying functionality specific to a set of software development scenarios into a software development scenario-independent framework. The integrated specification can then be compiled to create the software development tool. Alternatively, integration can be achieved at runtime without access to source code. The architecture can use any combination of the following: a software scenario independent intermediate representation format, one or more exception handling models capable of supporting a plurality of programming language specific exception handling models, a type system capable of representing the type representations of a plurality of source languages, and a code generator capable of generating code targeted for a plurality of execution architectures.

26 Claims, 27 Drawing Sheets

U.S. PATENT DOCUMENTS

| | | | |
|---|---|---|---|
| 4,734,854 A * | 3/1988 | Afshar | 717/107 |
| 5,339,419 A | 8/1994 | Chan et al. | |
| 5,355,491 A | 10/1994 | Lawlor et al. | |
| 5,488,727 A | 1/1996 | Agrawal et al. | |
| 5,577,253 A * | 11/1996 | Blickstein | 717/156 |
| 5,598,560 A | 1/1997 | Benson | |
| 5,628,016 A | 5/1997 | Kukol | |
| 5,659,753 A | 8/1997 | Murphy | |
| 5,696,974 A | 12/1997 | Agrawal et al. | |
| 5,742,828 A | 4/1998 | Canady et al. | |
| 5,754,858 A | 5/1998 | Broman et al. | |
| 5,768,595 A | 6/1998 | Gillies | |
| 5,778,233 A | 7/1998 | Besaw et al. | |
| 5,857,105 A | 1/1999 | Ayers et al. | |
| 5,918,235 A | 6/1999 | Kirshenbaum et al. | |
| 5,937,195 A | 8/1999 | Ju et al. | |
| 5,943,499 A | 8/1999 | Gillies et al. | |
| 5,966,702 A | 10/1999 | Fresko et al. | |
| 5,999,739 A | 12/1999 | Soni et al. | |
| 6,009,273 A | 12/1999 | Ayers et al. | |
| 6,041,179 A | 3/2000 | Bacon et al. | |
| 6,070,011 A | 5/2000 | Liu et al. | |
| 6,131,187 A | 10/2000 | Chow et al. | |
| 6,148,302 A | 11/2000 | Beylin et al. | |
| 6,149,318 A | 11/2000 | Chase et al. | |
| 6,151,703 A * | 11/2000 | Crelier | 717/136 |
| 6,182,284 B1 | 1/2001 | Sreedhar et al. | |
| 6,202,204 B1 | 3/2001 | Wu et al. | |
| 6,212,672 B1 | 4/2001 | Keller et al. | |
| 6,247,169 B1 | 6/2001 | DeLong | |
| 6,247,172 B1 | 6/2001 | Dunn et al. | |
| 6,249,910 B1 | 6/2001 | Ju et al. | |
| 6,253,304 B1 | 6/2001 | Hewitt et al. | |
| 6,286,134 B1 | 9/2001 | Click et al. | |
| 6,289,446 B1 * | 9/2001 | Nilsson | 712/244 |
| 6,292,938 B1 | 9/2001 | Sarkar et al. | |
| 6,330,717 B1 | 12/2001 | Raverdy et al. | |
| 6,353,924 B1 | 3/2002 | Ayers et al. | |
| 6,363,522 B1 | 3/2002 | Click et al. | |
| 6,374,368 B1 | 4/2002 | Mitchell et al. | |
| 6,381,738 B1 | 4/2002 | Choi et al. | |
| 6,412,020 B1 * | 6/2002 | Leach et al. | 719/316 |
| 6,412,109 B1 | 6/2002 | Ghosh | |
| 6,421,667 B1 | 7/2002 | Codd et al. | |
| 6,460,178 B1 | 10/2002 | Chan et al. | |
| 6,463,581 B1 | 10/2002 | Bacon et al. | |
| 6,481,008 B1 | 11/2002 | Chaiken et al. | |
| 6,484,312 B1 | 11/2002 | Morrison | |
| 6,487,716 B1 | 11/2002 | Choi et al. | |
| 6,526,570 B1 | 2/2003 | Click et al. | |
| 6,560,774 B1 * | 5/2003 | Gordon et al. | 717/146 |
| 6,578,090 B1 | 6/2003 | Motoyama et al. | |
| 6,598,220 B1 | 7/2003 | Valys et al. | |
| 6,625,804 B1 | 9/2003 | Ringseth et al. | |
| 6,625,808 B1 | 9/2003 | Tarditi | |
| 6,629,312 B1 | 9/2003 | Gupta | |
| 6,634,023 B1 | 10/2003 | Komatsu et al. | |
| 6,662,356 B1 | 12/2003 | Edwards et al. | |
| 6,678,805 B1 | 1/2004 | Corduneanu et al. | |
| 6,738,967 B1 * | 5/2004 | Radigan | 717/146 |
| 6,745,383 B1 | 6/2004 | Agarwal et al. | |
| 6,748,584 B1 | 6/2004 | Witchel et al. | |
| 6,851,108 B1 * | 2/2005 | Syme et al. | 717/146 |
| 6,981,249 B1 | 12/2005 | Knoblock et al. | |
| 6,986,125 B2 * | 1/2006 | Apuzzo et al. | 717/124 |
| 7,055,132 B2 | 5/2006 | Bogdan et al. | |
| 7,117,488 B1 | 10/2006 | Franz et al. | |
| 7,120,898 B2 | 10/2006 | Grover et al. | |
| 7,168,060 B2 | 1/2007 | Matsumoto et al. | |
| 7,370,321 B2 * | 5/2008 | Radigan | 717/144 |
| 7,380,242 B2 * | 5/2008 | Alaluf | 717/148 |
| 2002/0026633 A1 * | 2/2002 | Koizumi et al. | 717/146 |
| 2002/0059568 A1 | 5/2002 | Kawahito et al. | |
| 2002/0083425 A1 | 6/2002 | Gillies et al. | |
| 2002/0095667 A1 | 7/2002 | Archambault | |
| 2002/0166115 A1 | 11/2002 | Sastry | |
| 2002/0170044 A1 | 11/2002 | Tarditi | |
| 2003/0018961 A1 | 1/2003 | Ogasawara | |
| 2003/0101335 A1 | 5/2003 | Gillies et al. | |
| 2003/0101380 A1 | 5/2003 | Chaiken et al. | |
| 2003/0131147 A1 * | 7/2003 | Wilt et al. | 709/321 |
| 2003/0145312 A1 * | 7/2003 | Bates et al. | 717/152 |
| 2003/0217196 A1 | 11/2003 | Chan et al. | |
| 2003/0217197 A1 | 11/2003 | Chan et al. | |
| 2003/0226133 A1 | 12/2003 | Grover | |
| 2004/0015897 A1 * | 1/2004 | Thompson et al. | 717/140 |
| 2004/0025152 A1 | 2/2004 | Ishizaki et al. | |
| 2004/0049769 A1 | 3/2004 | Lueh et al. | |
| 2004/0093604 A1 | 5/2004 | Demsey et al. | |
| 2004/0095387 A1 | 5/2004 | Demsey et al. | |
| 2004/0098710 A1 * | 5/2004 | Radigan | 717/144 |
| 2004/0098724 A1 | 5/2004 | Demsey et al. | |
| 2004/0098731 A1 | 5/2004 | Demsey et al. | |
| 2004/0117771 A1 * | 6/2004 | Venkatapathy | 717/130 |
| 2004/0172639 A1 | 9/2004 | Luo et al. | |
| 2004/0268327 A1 * | 12/2004 | Burger | 717/140 |

FOREIGN PATENT DOCUMENTS

| | | |
|---|---|---|
| EP | 0 665 493 | 8/1995 |
| EP | 0 757 313 | 2/1997 |
| EP | 1 049 010 | 11/2000 |

OTHER PUBLICATIONS

"The LEX & YACC Page," http://dinosaur.compilertools.net/, 4 pages, website visited on Jun. 16, 2003.

"Zephyr Abstract Syntax Description Language (ASDL): Zephyr ASDL," http://web.archive.org/web/19991103153820/http://www.cs.virginia.edu/zephyr/asdl.html, 1 page, Nov. 3, 1999.

"Zephyr Compiler Infrastructure: Zephyr: Tools for a National Compiler Infrastructure," http://web.archive.org/web/20000817014546/http://www.cs.virginia.edu/zephyr/, 1 page, Aug. 17, 2000.

"Zephyr Computer Systems Description Languages (CSDL): Generating Machine-Dependent Compiler Parts Using CSDL," http://web.archive.org/web/20000829045324/www.cs.virginia.edu/zephyr/csdl/, 1 page, Aug. 29, 2000.

"Zephyr Register Transfer Lists (RTLs): Compiling with Register Transfer Lists (RTLs)," http://web.archive.org/web/20000829045407/http://www.cs.virginia.edu/zephyr/rtl.html, 2 pages, Aug. 29, 2000.

"Zephyr Very Portable Optimizer (vpo): Machine-Independent Optimization," http://web.archive.org/web/20010424131242/http://www.cs.virginia.edu/zephyr/vpo/, 1 page, Apr. 24, 2001.

Aigner et al., "SUIF Compiler System: The SUIF Program Representation," Computer Systems Laboratory, Stanford University and the Portland Group, Inc., http://suif.stanford.edu/suif/suif2/doc-2.2.0-4/suifguide/, pp. 1-30, Aug. 14, 2000.

Appel et al., "The Zephyr Compiler Infrastructure," Internal Report, http://www.cs.virginia.edu/zephyr, Princeton University and University of Virginia, pp. 1-10, Nov. 6, 1998.

Benitez et al., "Target-Specific Global Code Improvement: Principles and Applications," Technical Report CS-94-92, Department of Computer Science, University of Virginia, pp. 1-14, 1994.

Lam, "An Overview of the SUIF2 System," ACM SIGPLAN '99 Conference on Programming Language Design and Implementation, Atlanta GA, 20 pages, http:suif.stanford.edu/suif/suif2/doc-2.2.0-4/tutorial/suif-intro.ppt, May 4, 1999.

Stallman, "Using and Porting the GNU Compiler Collection," 504 pages, http://www.skyfree.org/linux/references/gcc-v3.pdf, Jul. 28, 1999.

Saito et al.; "PROMIS IR Design"; Sep. 29, 1997; pp. 1-4.

Saito et al.; "PROMIS IR Implementation—AST Components—"; Sep. 29, 1997; pp. 1-4.

Polychronopoulos et al.; "The Promis Compiler Project—Annual Report"; Oct. 1, 1997; pp. 1-15.

Fitzgerald et al.; "Marmot: An Optimizing Compiler for Java"; Technical Report MSR-TR-99-33; Jun. 16, 1999; pp. cover page and 1-29.

"1.3 Compiler Architecture" http://lambda.uta.edu/cse5317/notes/node5.html visited on May 20, 2003; pp. 1-2.

"Implementation of a Parallelizing Compiler with a Universal Intermediate Representations: Translating of Source Codes into Universal Intermediate Representations" http://www.ipsj.or.jp/members/SIGNotes/Eng/22/1997/017/article004.html visited on May 20, 2003; pp. 1-2.

"Scale Download"; Dept. of Computer Science, University of Massachusetts Amherst; http://www-ali.cs.umass.edu/Scale/download.html visited on May 20, 2003; pp. 1-13.

"Overview of the SA-C Compiler" http://www.cs.colostate.edu/Cameron/compiler.html visited on May 20, 2003; pp. 1-2.

"PROMIS Release Announcement" http://www.csrd.uiuc.edu/promis/release_announcement.html visited on May 20, 2003; pp. 1-3.

"Scale"; Dept. of Computer Science, University of Massachusetts Amherst; http://www-ali.cs.umass.edu/Scale/ visited on May 20, 2003; pp. 1-46.

"CIL: Infrastructure for C Program Analysis and Transformation"; May 30, 2003; pp. 1-54.

"PROMIS Implementation—The Illinois-Irvine PROMIS Team" http://www.csrd.uiuc.edu/promis/ visited on Jun. 4, 2003; pp. 1-32.

"Illinois-Irvine PROMIS Compiler Internal Representation" http://www.csrd.uiuc.edu/promis/ visited on Jun. 4, 2003; pp. 1-17.

"Technical Overview" http://www.csrd.uiuc.edu/promis/overview.html visited on Jun. 4, 2003; pp. 1-2.

"A Parallelizing Compiler Framework" http://www.csrd.uiuc.edu/promis/home.html visited on Jun. 4, 2003; pp. 1-2.

"Demystifying .NET Compilation" http://www.zdnet.com.au/printfriendly?AT=2000035027-20264543, pp. 1-4, including 1 page of "Figure A", Apr. 12, 2002.

Sun Microsystems, Inc., "The Java Laguage Environment: 6—Security in Java, 6.3 The Byte Code Verification Process" http://web.archive.org/web/19990302092957/http://java.sun.com/docs/white/langenv/Security.doc3.html, 3 pages (Mar. 2, 1999).

Yellin, "Low Level Security in Java" http://web.archive.org/web/19990117003400/http://java.sun.com/sfaq/verifier.html 13 pages (Jan. 17, 1999).

ANDF Consortium, "ANDF Overview" http://web.archive.org/web/20021208181559/http://www.info.uni-karlsruhe.de/~andf/overview.htm, 2 pages (Dec. 8, 2002).

X/Open Company Ltd., "X/Open Preliminary Specification, Architecture Neutral Distribution Format (XANDF)" pp. 1-10 (X/Open Company Ltd. 1996).

Cedilla Systems Inc., Products http://web.archive.org/web/20010728193511/www.cedillasystems.com/pages/about/products.html, 2 pages (Jul. 28, 2001).

Lee, A Certifying Compiler for Java http://www-2.cs.cmu.edu/~petel/pcc/pcc-slides/SDIPOP.pdf, 10 pages (Sep. 2000).

Aho et al., "Compilers: Principles, Techniques and Tools", Copyright © 1986 by Bell Telephone Laboratories, Inc., cover and pp. ii, vii-x, 12-14, 463-512, and 585-722.

Appel, "Modern Compiler Implementation in ML", Copyright © Andrew W. Appel, 1998, Cambridge University Press, cover and pp. iv-viii, 148-210, 344-376, and 427-467.

Fraser et al., "A Retargetable C Compiler: Design and Implementation", Copyright © 1995 by AT&T and David R. Hanson, cover and pp. iv, vii-xii, 311-372.

"C/C++ Language Reference: try-except Statement," May 11, 2000, Microsoft Corp., accessed Jul. 10, 2005 at <http://msdn.microsoft.com/library/default.asp?url=/library/en-us/vccelng/htm/key_s-z_4.asp>, 2 pages.

International Search Report, Sep. 1, 2005, PCT/US04/15965, 13 pages.

Chiba et al., "Josh: An Open AspectJ-like Language," Proceedings of the International Conference on Aspect-Oriented Software Development (AOSD), Lancaster, UK, pp. 102-111, Apr. 22, 2002.

European Examination Report, European Patent Application No. 04 014 358.8, 11 pages, dated Jun. 13, 2008.

Lidin, "Inside Microsoft®.NET IL Assembler," Microsoft Press, <http://proquest.safaribooksonline.com/0735615470>, Overview, Table of Contents, Chapter 6—Namespaces and Classes—Interfaces, Chapter 6—Namespaces and Classes—Enumerators, and Chapter 7—Primitive Types and Signatures—Primitive Types in the Common Language Runtime, 27 pages (Feb. 6, 2002).

Arnold et al., "Exploring the Interaction between Java's Implicitly Thrown Exceptions and Instruction Scheduling," International Journal of Parallel Programming, vol. 29, Issue 2, pp. 111-137 (Apr. 2001).

Grimes, Richard Dr., "Professional DCOM Programming," Canada, Wrox Press Ltd., Chapter 3, 72 pages (Jun. 1997).

Gupta et al., "Optimizing Java Programs in the Presence of Exceptions," Lecture Notes in Computer Science; vol. 1850, ISBN:3-540-67660-0, pp. 422-446 (Jun. 2000).

Lidin, Serge, "Inside Microsoft .Net IL Assembler," Redmond, Washington, Microsoft Press, Chapters 5-9 and Chapters 15-16, 214 pages (Feb. 2002).

"Smalltalk: A White Paper Overview," Porter III, <http://web.cecs.pdx.edu/~harry/musings/SmalltalkOverview.pdf>, pp. 1-77, Mar. 2003.

Taft, "Programming the Internet in Ada 95," Ada-Europe, p. 1-19, <http://citeseer.ist.psu.edu/taft96programming.html> (Jun. 1996).

* cited by examiner

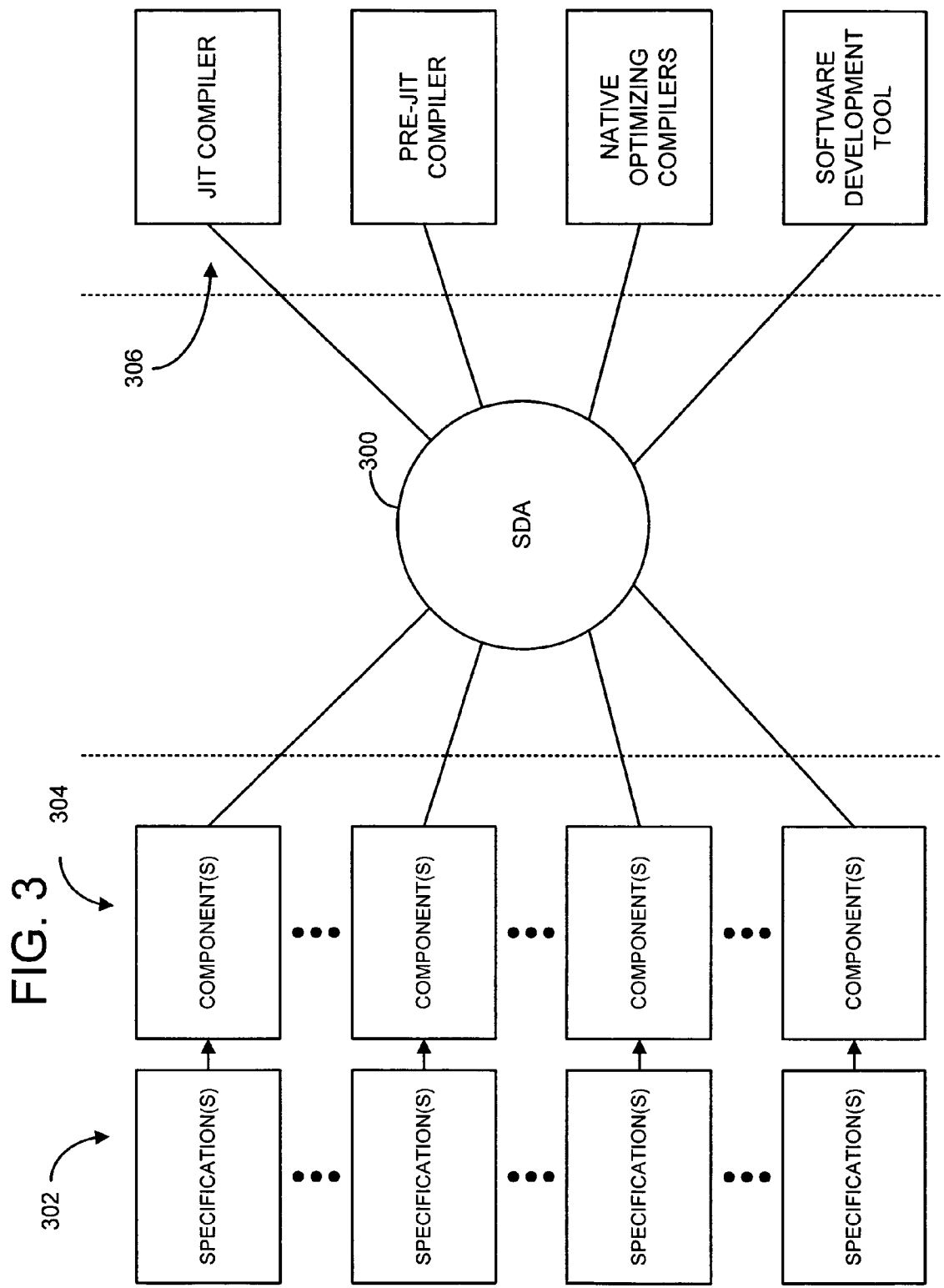

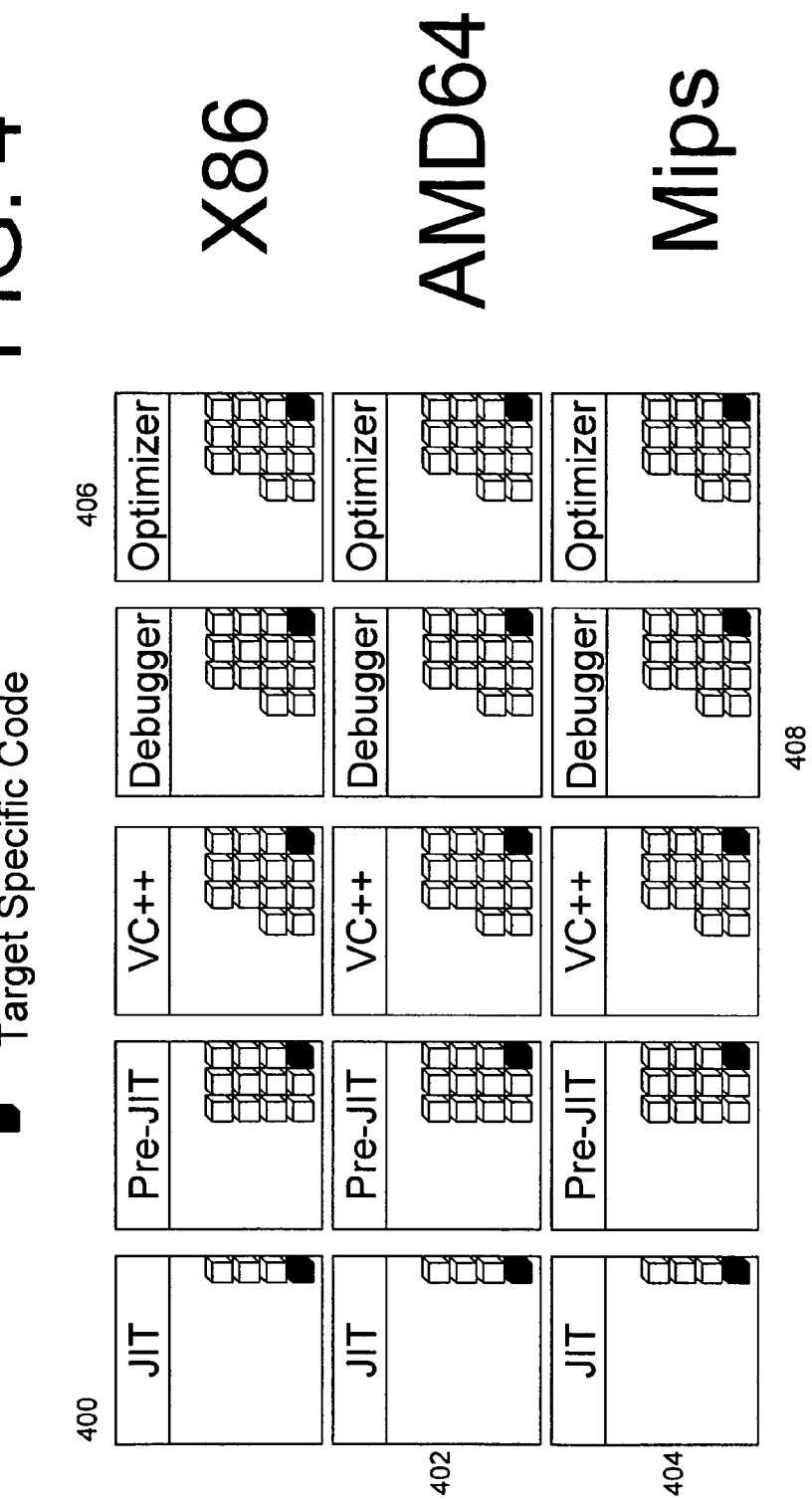

FIG. 6(a)

Source

```
int foo(int a, int b)
{
    int r;

if (a < b)
    {
        r = a + 1;
    }
    else
    {
        r = b + 1;
    } return r;
}
```

FIG. 6(b)

Dump of high-level, machine independent IR

```
    _a.i32, _b.i32   = ENTER _foo                             #4
    t107.cond        = CMP(LT) _a.i32, _b.i32                 #7
                       CBRANCH(LT) t107.cond, L2, L1          #7
L2:                                                           #7
    t108.i32         = ADD _a.i32, 1.i32                      #9
    _r.i32           = ASSIGN t108.i32                        #9
                       GOTO L3                               #11
L1:                                                           #7
    t109.i32         = ADD _b.i32, 1.i32                     #13
    _r.i32           = ASSIGN t109.i32                       #13
                       GOTO L3                               #11
L3:                                                          #11
                       RETURN _r.i32                         #16
                       GOTO L4                               #16
L4:                                                          #16
                       EXIT _foo                             #17
```

FIG. 6(c)
Dump of high-level with SSA, machine independent IR

Explicit wiring of SSA graph using definition numbers shown in <#> blue.

```
<1>_a.i32, <2>_b.i32    = ENTER _foo                              #4
   <3>t107.cond         = CMP(LT) <1>_a.i32, <2>_b.i32            #7
                          CBRANCH(LT) <3>t107.cond, L2, L1        #7
L2:                                                               #7
   <4>t108.i32          = ADD <1>_a.i32, 1.i32                    #9
   <5>_r.i32            = ASSIGN <4>t108.i32                      #9
                          GOTO L3                                 #11
L1:                                                               #7
   <6>t109.i32          = ADD <2>_b.i32, 1.i32                    #13
   <7>_r.i32            = ASSIGN <6>t109.i32                      #13
                          GOTO L3                                 #11
L3:                                                               #11
   <8>_r.i32            = PHI <5>_r.i32, <7>_r.i32                #16
                          RETURN <8>_r.i32                        #16
                          GOTO L4                                 #16
L4:                                                               #16
                          EXIT _foo                               #17
```

FIG. 6(d)
Dump of low-level, machine dependent IR (target X86)

```
   _a.i32, _b.i32       = ENTER _foo                              #4
   {ESP}                = push EBP.i32, {ESP}                     #4
   EBP.i32              = mov ESP.i32                             #4
   ESP.up32->unk, EFLAGS.cc32 = sub ESP.up32->unk, 4.i32          #4
                          PROLOGEND                               #4
   t110(EAX).i32        = mov _b[EBP.up32->unk].i32.a32           #7
   t107(EFLAGS).cond    = cmp(LT) _a[EBP.up32->unk].i32.a32, t110(EAX).i32  #7
                          jge(GE) t107(EFLAGS).cond, L1           #7
L2:                                                               #7
   tv108-(EAX).i32      = mov 1.i32                               #9
   tv108-(EAX).i32, EFLAGS.cc32 = add tv108-(EAX).i32, _a[EBP.up32-
>unk].i32.a32
#9
   _r[EBP.up32->unk].i32.a32 = mov tv108-(EAX).i32                #9
                          jmp L3                                  #11
L1:                                                               #7
   tv109-(EAX).i32      = mov 1.i32                               #13
   tv109-(EAX).i32, EFLAGS.cc32 = add tv109-(EAX).i32, _b[EBP.up32-
>unk].i32.a32
#13
   _r[EBP.up32->unk].i32.a32 = mov tv109-(EAX).i32                #13
L3:                                                               #11
   t113(EAX).i32        = mov _r[EBP.up32->unk].i32.a32           #16
L4:                                                               #16
                          EPILOGSTART                             #17
   ESP.i32              = mov EBP.i32                             #17
   EBP.i32, {ESP}       = pop {ESP}                               #17
   {ESP}                = ret {ESP}                               #17
                          EXIT _foo, t113(EAX).i32                #17
```

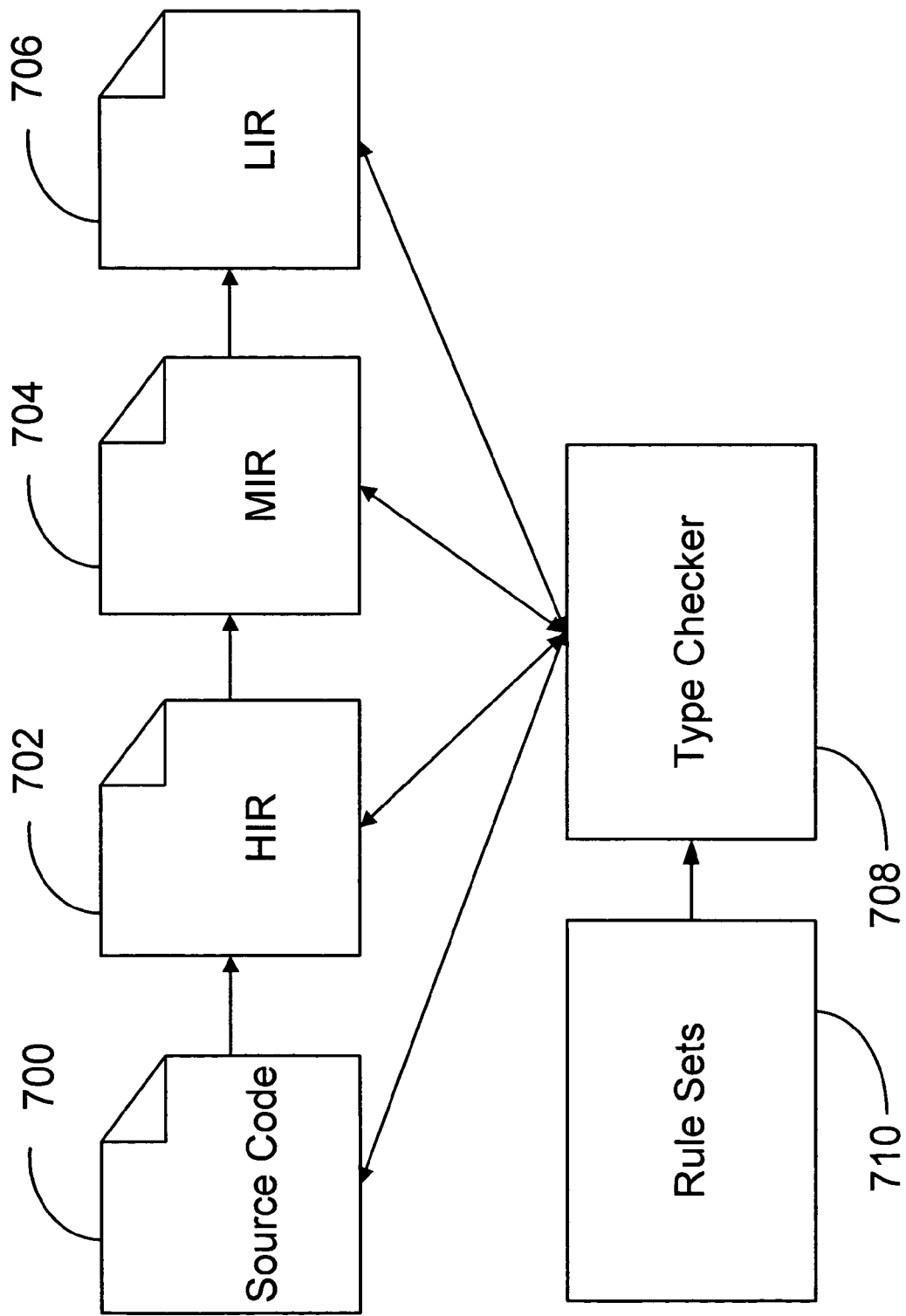

SOFTWARE DEVELOPMENT INFRASTRUCTURE

RELATED APPLICATION DATA

This application is a continuation-in-part application of and claims priority from the following U.S. patent applications, all of which are hereby incorporated herein by reference: application Ser. No. 10/607,591, filed Jun. 27, 2003, with inventorship listed as Mark Ronald Plesko and David Read Tarditi, Jr., entitled, "TYPE SYSTEM FOR REPRESENTiNG AND CHECKING CONSISTENCY OF HETEROGENEOUS PROGRAM COMPONENTS DURING THE PROCESS OF COMPILATION;" application Ser. No. 10/610,692, filed Jun. 30, 2003 now U.S. Pat. No. 7,559,050, with inventorship listed as Julian Burger, entitled, "GENERATING SOFTWARE DEVELOPMENT TOOLS VIA TARGET ARCHITECTURE SPECIFICATION;" application Ser. No. 10/626,251, filed Jul. 23, 2003 now U.S. Pat. No. 7,305,666, with inventorship listed as Julian Burger, David Read Tarditi, Jr., Charles L. Mitchell, Andrew Edward Ayers and Vinod K. Grover, entitled, "DESCRIPTION LANGUAGE FOR AN EXTENSIBLE COMPILER AND TOOLS INFRASTRUCTURE;" application Ser. No. 10/625,892, filed Jul. 22, 2003 now U.S. Pat. No. 7,146,606, with inventorship listed as Charles L. Mitchell, Julian Burger, Vinod K. Grover and David Read Tarditi, Jr., entitled, "GENERAL PURPOSE INTERMEDIATE REPRESENTATION OF SOFTWARE FOR SOFTWARE DEVELOPMENT TOOLS;" and application Ser. No. 10/609,275, filed Jun. 26, 2003 now U.S. Pat. No. 7,120,898, with inventorship listed as Vinod K. Grover and Akella V.S. Sastry, entitled, "AN INTERMEDIATE REPRESENTATION FOR MULTIPLE EXCEPTION HANDLING MODELS."

TECHNICAL FIELD

The technical field relates to software development, and particularly, to an architecture for facilitating the creation of software development tools.

BACKGROUND

A number of programming languages are available to provide programmers advantages in programming that are particular to each language. Similarly, numerous processors are available to provide advantages for executing particular tasks that are particular to each processor. For example, embedded processors are particularly suited for handling well defined tasks within electronic devices, whereas a general purpose processor such as an Intel® Pentium® processor is more flexible and can handle complex tasks. Furthermore, there are a variety of tool types created to help programmers deal with an increasing demand for software reliability, security, and high performance. Thus, the diversity in computing environments, configurations, and devices is increasing. Software developers are therefore faced with accommodating and working within a dizzying array of diverse software development scenarios.

The need to address such diversity has complicated the already highly complex field of building software development tools. Such software development tools can comprise various components, such as assemblers, disassemblers, decoders, encoders, instruction selection components, and instruction legalization components. Often, such components have overlapping requirements, and the components themselves may appear in more than one development tool (e.g., in a compiler and a debugger).

Despite the widespread necessity for similar component functionality, it has been challenging to develop tool components that share design and implementation, particularly across a range of programming languages or other program representations. Often, each component for each tool has its own implementation, resulting in much redundant work and duplicated code. Additionally, there may be little uniformity across architectures, even within the same source base. Therefore, any improvements made in the code of one component help a specific implementation, but the improvement is not automatically propagated to other tools or architectures implementing the same functionality. Finally, effort expended to address a particular software development scenario must typically be re-worked to address different scenarios.

SUMMARY

A software development architecture (SDA) is provided for constructing a wide range of components for software development tools. The components can be used for programs written in one or more source languages or computer-readable inputs such as binary executable files. These components may then be combined to create software development tools. The SDA includes various aspects. The various aspects may be used separately and independently, or the various aspects may be used in various combinations and sub-combinations.

In one aspect, an SDA uses an intermediate representation capable of representing a plurality of programming languages and other computer-readable program formats such as binary executable files, one or more exception handling models capable of supporting a plurality of programming languages or other computer-readable program formats, and a type system capable of representing the type representations of a plurality of source languages or other computer-readable program formats. In addition, the intermediate representation is able to represent binary executables for a plurality of execution architectures. Thus, components written using this intermediate representation can be applied to programs written in a variety of programming languages, to computer-readable representations of programs such as binary executable files or object files, and to programs for specific target architectures. This reduces the cost of developing software tools by allowing the sharing of components. It facilitates improved analysis and optimization of programs comprised of heterogeneous components. The components can include dataflow analyses, control-flow analyses, program transformations, data representation optimizations, register allocators, and instruction schedulers.

In one aspect, a method is provided for creating a component of a software development tool by integrating a specification for implementing functionality specific to a software development scenario into a software development scenario-independent framework. Such software development scenarios can relate to programming language, target execution architecture, level of intermediate representation, and the like.

In yet another aspect, computer-executable software is provided for producing software development tools comprised of extended versions of the intermediate representation and shared components. The software accepts a selection of one of a plurality of configurations for the software that describes a target software development tool; can incorporate data specific to the target software development tool into the intermediate representation; and can produce the components that comprise the target software development tool consistent with the configuration and data. In this way, components and the intermediate representation can be extended to be used in new and unforeseen situations, such as new requirements on existing tools, novel types of tools, new or improved programming languages, and new computer architectures.

These and other aspects will become apparent from the following detailed description, which makes reference to the accompanying drawings.

BRIEF DESCRIPTION OF THE DRAWINGS

FIG. 3 is a high-level block diagram of a system for creating components of software development tools using an SDA.

FIG. 4 shows a block view of compilers, a debugger, and optimizer for each of three target execution architectures created using a system such as that shown in FIG. 3.

FIGS. 6(a)-(d) walk through IR transformations from reading in source to high-level machine independent IR to low-level machine dependent IR.

FIG. 7 is a block diagram of one embodiment of a compiler system for type-checking an IR at various stages of compilation.

DETAILED DESCRIPTION

Figure 1:
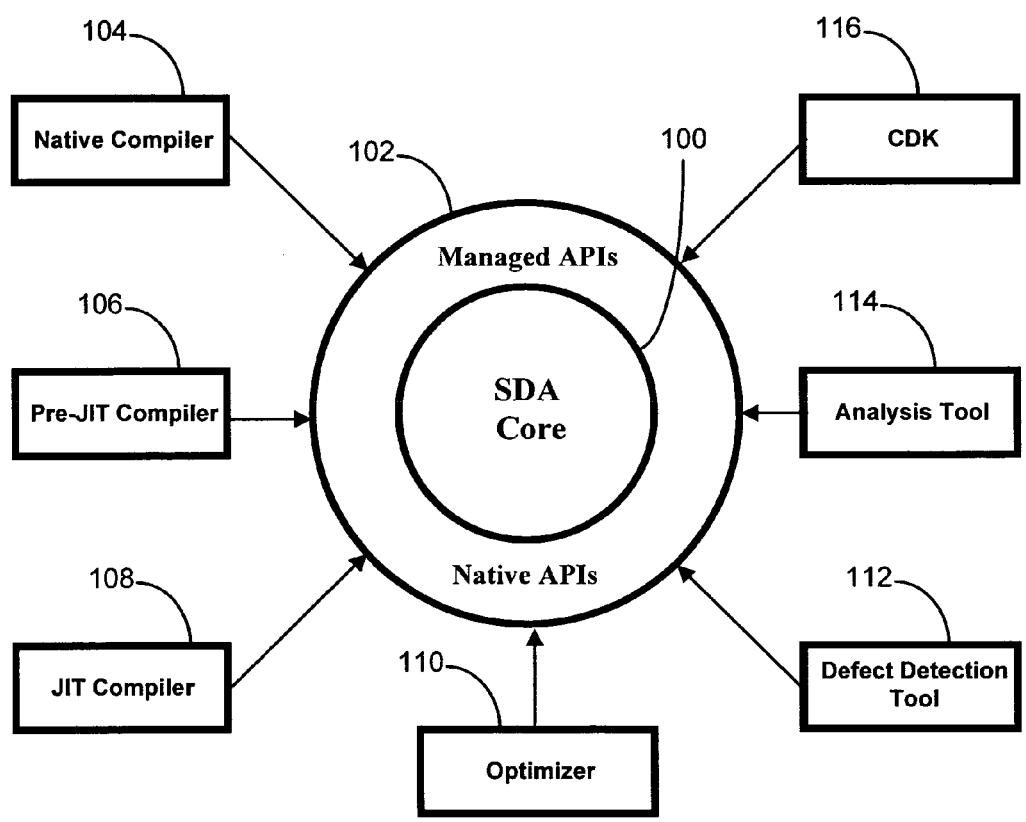
FIG. 1 shows a block diagram of an SDA for constructing a wide range of software development tools.

An SDA is provided for constructing components for a wide range of software development tools and connecting those components to form tools. The SDA is capable of constructing a variety of software development tools that may take any number of programming languages as input and output code for any number of target execution architectures.

Exemplary Target Execution Architectures

The target execution architectures described herein can include any of a variety of hardware machines or virtual machines. A target execution architecture can include any environment for executing code. Such target execution architectures can include the Intel® x86, AMD, IPF, ARM and MIPS architectures, as well as other architectures, including those hereafter implemented.

The Intel® x86 architecture includes, but is not limited to, any processor based on the Intel® x86 architecture, such as the 80x86, 80x88, Intel186, Intel286, Intel386, Intel486, and Pentium processors available from Intel Corporation. The AMD architecture includes, but is not limited to, the AMD64 and AMD32 architectures available from Advanced Micro Devices (AMD), Inc. The IPF (Itanium processor family) architecture includes, but is not limited to, the IA64 architecture available from Intel Corporation. The ARM architecture includes numerous 16 and 32 bit embedded RISC microprocessors available from ARM Ltd. The MIPS architecture includes, but is not limited to, the MIPS64™ and MIPS32™ architectures available from MIPS Technologies Inc.

Exemplary Software Development Tools

The software development tools described herein can include any of a variety of tools useful for developing software. Such tools may include native code compilers, Just-in-Time (JIT) compilers, debuggers, simulators, analysis tools, defect detection tools, compiler development kits (CDKs) and optimizers.

Such software development tools can include components such as program transformation components, program analyses components, assemblers, disassemblers, decoders, encoders, instruction selection components, instruction legalization components, and the like. In some cases, a component itself can serve as a tool.

Exemplary Software Development Scenarios

Any of numerous software development scenarios can influence the functionality of a SDA. For example, a software development scenario for a particular software development tool may include various target execution architectures (e.g., IPF, X86, AMD, ARM etc.) to which the software development tool will be targeted. Also, software development scenarios may be related to a type of compilation being performed (e.g., JIT or Native Optimizing Compiler). Software development scenarios may also be related to other types functionality performed by the software development tool such as type of analysis, optimization, simulation, debugging, code generation etc. Yet another software development scenario may be related to a particular programming language (e.g., JAVA, C++, C#etc.) for which the software development tool may be specially configured. Such languages may have different exception-handling models. Furthermore, software development scenarios may also relate to whether or not the tool is to be used with a managed execution environment (e.g., Microsoft CLR's environment provided by the Microsoft .NET Framework. Common Language Runtime (CLR) is microsoft's commercial implementation of the Common Language Infrastructure (CLI) specification; Microsoft is a trademark of Microsoft Corporation.) Other scenarios are possible.

The SDA can be used to create components for tools addressing any one or more software development scenarios. For example, the SDA can be used to create components for a tool operable to accept any one or a number of programming languages, generate code for any one of a number of target execution architectures, and the like.

Software Development Architecture

FIG. 1 shows a block diagram of an SDA used as a base for constructing a wide range of software development tools by using the SDA to construct any number of components in any one of a number of configurations. The set of components 100 represents modules that can be used by any configuration. These modules are built using core functionality provided by the SDA. The SDA core 100 may be provided as a set of object files or source code. The SDA core 100 presents a number of managed and/or native application program interfaces 102 (APIs). Each block surrounding SDA core 100 and APIs 102 represents possible software development tools built using the SDA. These tools may include native compilers 104, Pre-JIT compilers 106, JIT compilers 108, optimization tools 110, defect detection tools 112, analysis tools 114, and Compiler Development Kits (CDK) 116.

The native compiler 104 represents one or more compilers of native machine code for a number of target execution architectures and a number of source languages. For instance, a native compiler 104 built using the SDA may compile programs written in the C++ programming language into native code for execution on an x86 target execution architecture.

A Pre-JIT compiler 106 can optimize and generate native code from an architecture-independent program representation such as the Common Intermediate Language (CIL) for Microsoft's .NET platform prior to running the application on any number of target execution architectures. Pre-JIT compilers can operate cached on a server, at install time, or on the fly on the client at load time (or in the background). For instance, a Pre-JIT use 106 of the SDA may be to create a Pre-JIT compiler designed for compiling CIL into native code for execution on an x86 target execution architecture.

A JIT compiler 108 can compile code as it is needed at runtime just-in-time) from an architecture independent representation such as-CIL on a target execution architecture. For instance, a JIT compiler 108 built using interfaces from the SDA may be designed for compiling CIL into native code at runtime on an AMD target execution architecture.

The defect detection tool 110 can detect defects statically (before a program is run) in code written in one or more of languages. The defect detection tools can be constructed to run on any number of target execution architectures. For instance, a defect detection use 110 of the SDA may be to create a defect detection tool designed to take code written in the C++ programming language as input and detect defects in the code. The defect detection tool can be designed to execute on, for instance, an x86 target execution architecture.

An analysis tool 112 analyzes code written in one or more languages. The analysis tools can be constructed to run on any number of target execution architectures. For instance, an analysis tool use 112 of the SDA may be to create an analysis tool designed to take code written in the C# programming language and determine which modules or lines of source code may be affected by a change in one specific module. This is known as program slicing and is helpful when modifying large systems.

An optimizer tool 114 optimizes code written in a number of languages. For instance, an optimizing tool use 114 of the SDA may be used to create an optimizing tool designed to take code written in the C++ programming language and optimize the layout of fields based on profile data. Alternatively, an optimizing tool can be created that is designed to optimize CIL from any Microsoft .NET language such as Managed C++.

The CDK use 116 enables third-parties to develop compilers independently. The CDK may include binaries of some or all of the components of the SDA, libraries of some or all of the components of the SDA, and source code for some or all of the components to allow third-parties to modify particular aspects of the system. For instance, a CDK tool 116 built using the SDA may be by chip vendors interested in quickly and cost effectively creating compilers for devices that use WinCE.

The described tools use all or some of the SDA core 100 elements. Additionally, the described tools can comprise additional components not present in the SDA core. Phases and components may be added or deleted from a configuration based on throughput, footprint, host, target, and code quality requirements.

For example, a native compiler 104 might have the highest budget in compilation time and memory footprint and be expected to produce the best code quality. This configuration tool might therefore have more optimization of code. By contrast, a JIT compiler 108 might require a faster compile time and a smaller memory footprint configuration that still yields somewhat optimized code. This tool therefore might maintain data structures like the flow graph, loop graph and SSA graph, as much as possible in order avoiding costly rebuilding. Additionally, the number of passes over the intermediate representation may be minimized.

Figure 2A:
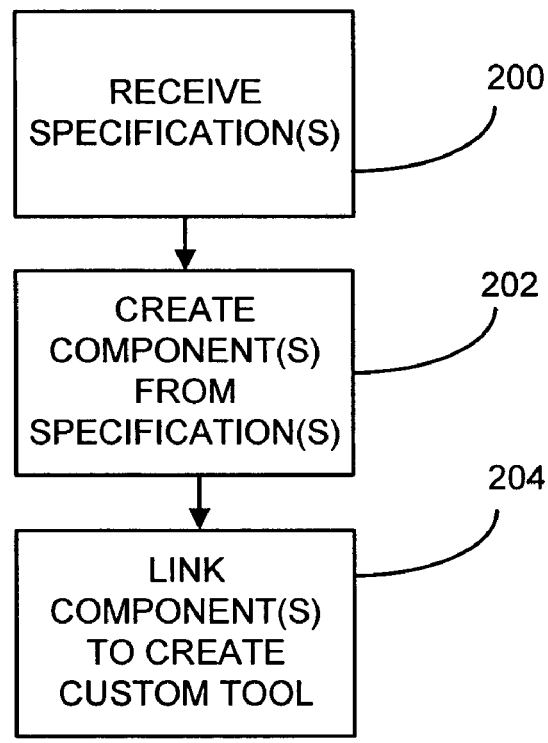
FIG. 2(a) is a flowchart for a method of creating software development tools using an SDA.

FIG. 2(a) is a flowchart for a method of creating software development tools using an SDA. Block 200 shows one or more specifications being received by an SDA. In block 202, software development components are created from the specifications (e.g., by generating source code and then compiling). In block 204, the components are linked to the SDA to create a customized software development tool. Alternatively, custom code providing additional functionality can be added to the specification and integrated into the components. A software development tool can then be created from the combination of the SDA and components.

Figure 2B:
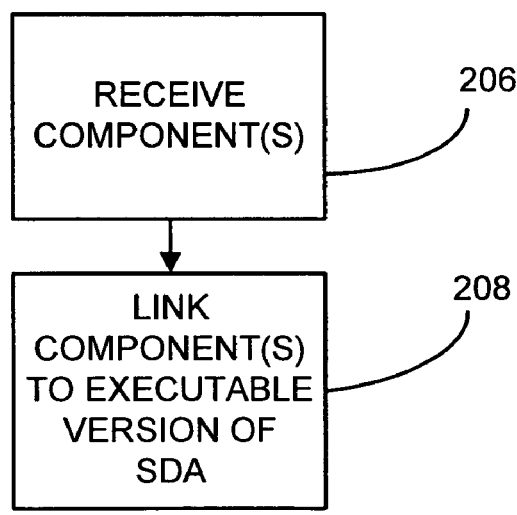
FIG. 2(b) shows another flowchart for a method of creating software development tools using an SDA.

Alternatively, FIG. 2(b) shows another flowchart for a method of creating software development tools using an executable version of an SDA. At block 206, software development components are provided, and at block 208, the components are linked to the SDA to create a customized software development tool (e.g., dynamically at runtime, without access to source code).

The specifications can be in any computer-readable language or form (e.g., object or executable code, source code, or custom language) suitable for specifying information for implementing functionality specific to one or more software development scenarios.

FIG. 3 is a high-level block diagram of a system for creating components of software development tools using an SDA 300. One or more specification(s) 302 are created to describe target specific details a software development scenario. For instance, the specification(s) 302 might indicate which programming language the target tool may take as input, such as Visual Basic, C#, a .NET language such as CIL, or C++. Likewise, the specification(s) might indicate the target execution architecture for the target software development tool, such as the x86, AMD, MIPS, or IPF architecture. Additionally, the specification(s) may contain other information such as rule sets for type-checking the input language, or a set of class extension declarations for extensibly configuring the SDA core data structures. The specification(s) 302 is then used to create software development component(s) 304 that can be linked to the SDA 300. The linked component(s) 304 and SDA 300 may be used in combination to create any number of tools 306, such as a JIT compiler, a Pre-JIT compiler, a native compiler, or other software development tool. Alternatively, custom code may be added to implement additional functionality to the target software development tool 304.

Thus, from a single source base, such as an SDA in a particular configuration, any number of components of software development tools can be created by simply supplying target specific data in order to customize the target software development tool for one or more software development scenarios. The software development tool can therefore be considered compartmentalized into both target specific and target agnostic modules. FIG. 4 illustrates this concept. FIG. 4 shows a block view of JIT, Pre-JIT, and Microsoft® Visual C++® native compilers, a debugger, and optimizer for each of three target execution architectures created using a system such as that shown in FIG. 3. Because the various tools for the execution architectures are built from a common SDA and specification(s), the target specific code for the software development tool supplied by the specification(s) or custom code is compartmentalized from the target agnostic code that can be supplied by a common SDA. Therefore, components for the target execution architectures can be the same in differing types of software development tools because they are created from the same specification(s).

Software development tools can be easily retargeted between different execution architectures because only the target specific components need be changed, and bugs found in either the target specific or target agnostic code can be fixed over a large scale.

For example, assume a developer wishes to retarget the JIT compiler 400 for the Intel® x86 architecture such that it will function on the AMD or MIPS architectures. The developer need only write an appropriate specification including data specific to the AMD or MIPS execution architecture. The target specific data is then integrated into the same or similar common SDA used to create the JIT compiler 400 for the Intel® x86 architecture. The integrated SDA and specification(s) is then used to create JIT compiler 402 for the AMD architecture, or JIT compiler 404 for the MIPS architecture.

Next, assume a developer finds a software defect in the optimizer 406 constructed using a specification(s) written for the Intel® x86 architecture. If the software defect is found in the target agnostic code, the code is most likely part of the common SDA. Therefore, the software defect may appear across the tools shown in FIG. 4.

Once an improvement is developed in a component built using the common SDA or the common SDA itself, improvements for the pictured fifteen tools (three compilers, two tools, for each of three different architectures) can be simultaneously initiated by implementing the fix in one source code base (the component or common SDA). Updated, corrected versions of the fifteen tools can be created by either by simply recompiling the specification(s) for each target execution architecture with the updated SDA or by distributing a new binary for the SDA and component.

Similarly, if the software defect is found in the target specific code of optimizer 406 for the Intel® x86 execution architecture, the software defect is most likely in the specification(s) written for the Intel® x86 execution architecture. Again, fixing the software defect across the tools for the Intel® x86 execution architecture only requires correcting one source code (the Intel® x86 specification(s)) and recompiling the updated specification(s) with the common SDA.

In addition to allowing quick retargeting to alternative execution architectures, the software development tools shown in FIG. 4 can be quickly redesigned to accept another programming language as input. For instance, assume for purpose of this example that the debugger 408 was created from a specification(s) that indicated the debugger 408 takes C++ as input and is targeted for the MIPS execution architecture. Redesigning the debugger 408 to take C# as an input and still execute on the MIPS architecture is as simple as rewriting the specification(s) to indicate a different input language. The new specification(s) can then be integrated into an identical or similar SDA and a new debugger is produced that takes C# as input.

SDA Core Data Structures and Abstractions

Machine Model—Retargeting Abstraction

In order to support rapid retargeting of the software development tools created using an SDA described herein, an SDA core is split into target agnostic and target specific portions. Wherever possible, common target specific code can be factored into a target agnostic SDA with calls into target-specific code to get information or perform transformations. Although only an example, the following sections describe implementation details of one embodiment of an SDA core. Alternative SDA cores may use any combination of the following or other features.

Registers

The machine register files can be accessed via APIs to query the number of register files (e.g. general purpose, floating point, predicate), determine which machine types they can handle (e.g., int32, float64, MMX) and obtain an object representing a machine register (e.g., EAX, r0, p3). Register objects can be derived from the Layout class and add the following information: an internal enumeration number for data flow, etc.; register name as a text string; attributes; binary encoding; an extensibility object.

Machine Dependent Opcodes

The machine opcode table can be accessed via APIs to query the number of opcodes and obtain an object representing an opcode (e.g., ADD, MOVZX). Opcode objects can encapsulate the following information: an internal opcode enumeration, opcode name as a text string, attributes, and an extensibility object.

Calling Conventions

Calling conventions can be made explicit by the lowering phase and can be implemented through the Application Binary Interface (ABI) specific callbacks in a target agnostic framework. The framework can include subroutines for common actions such as allocating a parameter to a register, demoting a register operand to a memory operand (for stack passing), etc.

Multiple calling conventions can be supported by annotating each call instruction with a target-specific attribute that describes the type of calling convention to be used at the call. This attribute can be maintained and propagated by the high-level and machine-independent optimization phases.

Exception Handling Model

The various exception handling (EH) models can be implemented target agnostically with queries of the machine model and call backs into any target specific code required. Exception handling will be discussed in more detail in a separate section below.

Code Generation

In this embodiment, code generation consists of instruction selection/lowering, intrinsic/switch/question op expansions, and instruction legalization. Register allocation and scheduling can be considered separate phases. Code generation will be discussed in more detail in a separate section below.

Encode

Encoding is the process of translating the compiler IR into binary machine code. There can be a machine agnostic framework for encoding with the bulk of the work occurring in target specific code produced.

Scheduling Tables

Scheduling tables can be used in global and local scheduling. A machine scheduling table can contain instruction latencies and functional units required by each machine instruction. The table can be generated via the retargeting tool used in code generation.

Disassembler

Disassembly can be driven by the code generation files. It can be implemented as a DLL that will be shared by the linker and debugger using a common interface.

Prolog/Epilog

The function prolog and epilog can be generated in a target agnostic framework with target specific callbacks. The prolog may contain any or all of the following items: frame pointer initialization; stack alignment; stack allocation; non-volatile register saves; exception handling structure initialization; runtime checks and initialization. The epilog may contain any or all of the following items: non-volatile register restores; stack de-allocation; frame pointer restoration; runtime checks. There can be potentially two frame pointers per function: a local pointer and a parameter pointer. These can be machine and function dependent.

Endian Support

Cross-targeting scenarios require the SDA be cognizant of endianness. The specification(s) can describe the target execution architecture's endianness. Emission routines can be designed to respect this accordingly.

Stack Allocation

The specification(s) can contain stack alignment and growth direction information. The stack allocation package can be responsible for calculating the maximum required local alignment and the total stack space used. Additionally, when a stack packing optimization is not used, stack offsets can be assigned to locals.

Type System

The type system for the IR serves many important purposes and will be discussed in more detail in a separate section below.

Function

A Function or Method object can describe the code that makes up a single procedure. The following attributes may be considered in describing a Function object:
  1) Function ID: unique identifier for a method.
  2) Function name
  3) Return value type
  4) Calling convention
  5) Function Signature or argument list
  6) Exception Info A function can contain provisions to be laid out in a non-contiguous manner. The exception info or any other data structures that have information that adheres to the layout of a function can be modified accordingly.

As a function is making its way through the various compiler stages, the function can be the sole entity that contains most information that is crucial for later stages. Also, the function object can be one that endures the most transformations, i.e. code separation, inlining, loop unrolling, etc. Consequently, the information associated with each function may become obsolete very quickly unless there is a conscious effort in keeping it moving along with the transformations.

For dataflow analysis to be successful across the whole function, it is desirable to be able to represent a whole function even though it is no longer physically contiguous.

Functions and Methods

It may not be necessary, in this embodiment, to distinguish between a function and a method. This may just be a terminology divergence when class hierarchy is introduced.

Class

A Class object can be a container for all functions or methods belonging to that class. The following attributes can describe a Class object:
  1) Class name
  2) Size
  3) List of Functions
  4) Type/layout information for data members including virtual call tables Since, in this embodiment, a class definition may not be broken up into multiple modules, it is important that a class internal representation can be reordered for optimization purposes. One such example of class reordering has to do with working-set reduction, due to the fact that there are many data structures pertaining to a Class object, which may have to be reordered as well to comply with the class internal layout.

Phase Control

Due to the configurability and extensibility of the described SDA and the desire to provide a uniform mechanism for connecting components, phase control can be provided via data rather than hard coding. Phase ordering can be specified by generating a list of phase objects. The phase list may be altered by configuration machine target, and user extensibility.

Each phase object can encapsulate debug pre-conditions (debug checks to be executed), execution pre-conditions (compilation flags that control the execution of the phase, e.g. -Od for global optimizations), pre-phase extensibility, the phase entry point, post-phase extensibility, debug post-conditions, a textual phase name, and pointers to the next and previous phases.

Individual phases can be responsible for recognizing that a function is "big" and throttling transformations appropriately. For example, the interference package may decide to give up on intensive analysis if the function has more than n IR nodes, being conservative to ensure correctness. Or an optimization may decide it will be too expensive to perform on the whole function and instead operate on regions or turn itself off entirely.

Main Driver

The main driver is responsible for initializing the SDA and any attached extensibility modules. At start up, the various system packages can be initialized according to the compiler configuration (primarily setting up the phase list). Then the target specific initialization can be run (which may provide extensibility features). Next, extensibility modules can be initialized (which may alter the phase list, attach to various data structures, etc.). At this point, the command line processor may be invoked. Finally, if no errors have occurred, the compilation manager (which may be configuration dependent) can take control.

Intermediate Representation (IR)

Figure 5:
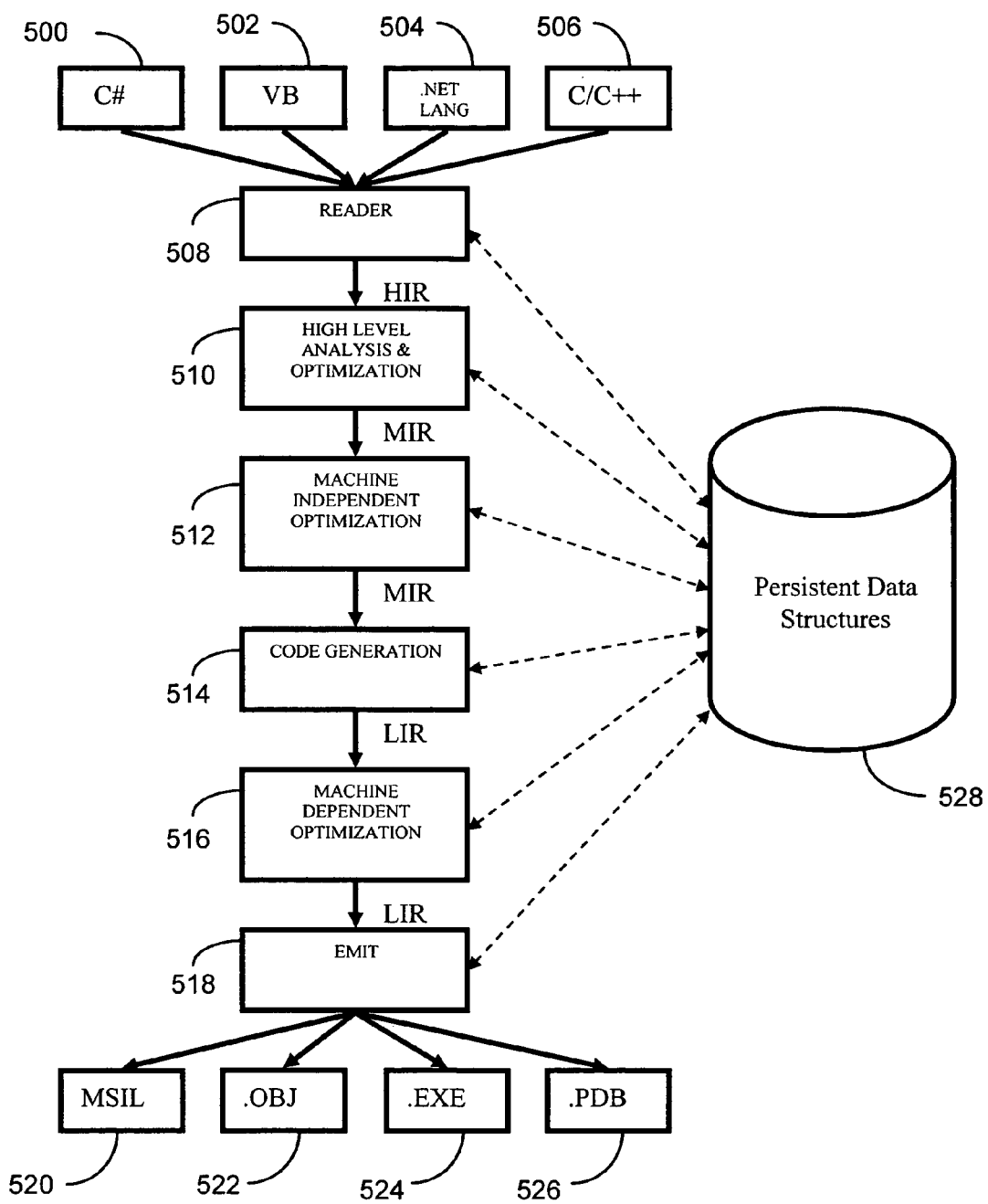
FIG. 5 shows a block diagram of an exemplary compilation process in a compiler created using an SDA.

In one embodiment of an SDA for creating components of tools as described herein, a single, common IR format is provided to represent a user program in memory during the entire execution of a tool. The IR format can express a range of code from high level, machine independent operations to low level target machine code using a single unified form. FIG. 5 shows a block diagram of an exemplary compilation process in a compiler created using an SDA that can take multiple languages as input, provide multiple languages as output, and be targeted for multiple execution architectures.

Source code 500-506 is written in four different source languages. For instance, source code 500 is written in C# while source code 506 is written in C++. Additionally, PE binaries and other executable formats may also be accepted as input. Source code is first processed and entered into the system by a reader 508. The source language is then translated into a high-level IR (HIR). The HIR can then optionally be analyzed and optimized at block 510. The HIR is then translated into a mid-level IR (MIR). This representation is lower than the HIR but still machine independent. At this point, the MIR can optionally be analyzed and optimized as shown at block 512. The MIR is then translated into a machine-dependent low-level IR (LIR) by code generation at block 514. LIR can then optionally be analyzed and optimized at block 516, and supplied to an emitter at block 518. The emitter will output code in one of many formats 520-526 representing the original source code read into the system. Throughout this process, the data necessary to complete the process is stored in some form of persistent memory 528.

Thus, the compilation process involves transforming instructions from one level or representation to another. In one embodiment, the process of translating the IR from high-level operations to machine code can be a series of optimizations and code generation passes that simply attribute the IR with more and more information while never changing the fundamental form. For instance, FIGS. 6(*a*)-(*d*) walk through IR transformations from reading in source to high-level machine independent IR to low-level machine dependent IR.

As these figures show, the IR simply gets expanded and attributed with target machine specifics like registers and actual machine opcodes. The form, however, stays substantially the same.

The IR also can be scaled for use in different SDA configurations. For instance, a Just-In-Time (JIT) compiler configuration is speed and memory constrained, and therefore the form of the IR used in the JIT compiler created using a JIT configuration of an SDA can be configured by adding or removing properties that tend to decrease the speed of compilation or increase the memory footprint. By contrast, high-end, whole program optimizing native compilers tend to be very resource intensive and require high code quality. Therefore, the form of the IR used in the native compiler created using a native compiler configuration of an SDA can be configured by adding or removing properties that tend to limit the speed of compilation or decrease the amount of memory available to the compiler.

In this embodiment, the IR used in an SDA can be a graph data structure organized as linear stream of dataflow operations represented by an operator, set of dataflow sources and set of dataflow destinations. Dataflow information and side-effects can be explicitly included in the dataflow sets. The IR may be strongly typed with source level type information to allow for robust code generation and type checking. The IR also may contain some or all of the dataflow and control flow links necessary to fully describe the program. In other words, if all the links necessary are present then no other data structure is needed, such as a flow graph, or exception handling tree/graph.

Additionally, any resources used or defined by an operation can appear on an operations source or destination list whether explicit or implicit. Dataflow analysis and compiler construction in general can be simplified because operands are all that need to be analyzed in order to determine the complete side-effect of an operation. Therefore, new operations are easy to add because they are implemented by simply recombining the same small set of operands in new ways.

The IR can include a single model for disambiguating memory and determining alias analysis through a single "tag" associated with operands. The tag can either be conservative or made very accurate through extensive analysis. All phases of the compiler can simply honor the tag and ask an "oracle" for the side-effects of the operation.

The following sections describe implementation details of one embodiment of an IR suitable for use in described embodiments of SDAs.

Exemplary IR

An exemplary IR for embodiments of the SDA can be implemented as a typed, linear stream of tuples. Each tuple can have a set of input operands (source list), an operator, and a set of output operands (destination list). Side effects (e.g., all side effects) can be explicit on the instruction including actual or implied register use/def and symbol use/def information. Indirections will have interference information attached to them.

The IR can exist with or without a flow graph; however, global optimizations may require one. Exception handling region graphs and optimization region graphs can also be used to augment the IR information. The IR should have sufficient information to build the flow graph, loop graph, and re-establish mapping to the exception handling region graph.

Since the flow graph (and loop and exception handling region graphs to a lesser extent) may almost always exist, the design can provide easy access to these graphs as in a system where they are part of the core IR.

The IR can be designed to directly support tree based and SSA based optimizations. This can be done by adding a def field on leaf tuples. In its simplest form, expression temps can be linked together to form expression trees. This can be an invariant for pre-lowered code. This expression threading can be ignored by analyses that do not need to use the expression view. Transformations can leave them in a correct state and may use an expression optimizer for cleanup. Full blown SSA can use the same def fields and include special operations like a PHI instruction. Under SSA, the expression temps can simply become a subset of the overall SSA graph.

To support inline _code, early phases of the compiler can see an "outline" instruction that summarizes the dataflow effect of the _asm sequence. The actual _asm instruction sequence can hang off as a side list until a very late stage of lowering inlines the sequence.

Although various examples of the IR show a lowering process, the IR can also be used in a raising process. For example, a tool may take a binary as input and construct IR for the binary.

Operands

Operands can be the leaf nodes of the instructions and appear on the source and destination list of the instructions. All side effects can be made explicit on the instructions so operands are present to depict some or all actual or potential resource usage including immediates, register, memory, and condition codes. Each leaf node can have a type associated with it denoting its abstract type, which in turn maps to a machine type on lowered instructions.

Register

A register operand can specify either an actual physical registers or a virtual register.

Temp Register

A temp operand can take one of two forms: 1) an expression temporary (i.e., a temp reg) can be a single def, single use, temporary used within an expression; or 2) a general temporary (i.e., temp var) can be introduced by the compiler for questionOps, CSEs, scalar replacement, and induction variables, and the like, and can have multiple defs and uses.

Expression temporaries may only live in registers and may never live across basic block boundaries. General temporaries can live in register or memory and can live across basic block boundaries. Neither may have their address taken.

Physical Register

A physical register is an actual machine register. This includes integer, floating point, multimedia, vector, and special purpose registers.

Named Register

A named register can be a user variable which is a candidate for or has been allocated to a physical machine register.

Memory

A memory operand can specify a value stored in memory or abstract memory. Abstract memory can be used for explicit interference calculations.

Named Memory

Named memory can specify a user variable that is stored in memory.

Vector Memory

Vector memory may be used in vector operands for vector operations.

Indirect Memory

Memory indirection is capable of expressing the most powerful address mode on any target machine Indirections also may contain interference information.

Abstract Memory

Abstract memory may be used to annotate instructions with explicit memory use/def side effects other than by direct reference (i.e., interference information).

Address

An address operand can specify the location of code or data.

Effective Address

Effective memory address operands are capable of expressing the most powerful address mode on any target machine.

Data Address

A data address can be the simple form of effective address used for accessing data.

Code Address

A code address can be the simple form of effective address used for non-local code.

Label

A label can be the simple form of effective address used for local code.

Condition Code

The IR can use an abstract concept for condition codes.

Register Set

Register sets can be used for representing kill sets and side-effects.

Immediate

An immediate operand can specify a known value that can appear in an instruction. This value may always be known by the compiler or only determined at a later stage, including the lowering, linking, and loading states.

Integer Immediate

Integer immediates can be normalized to the largest integer size.

Float Immediate

Float Immediates can be normalized to an internal/portable form.

Symbolic Immediate

Symbolic immediates can be symbols representing constant values calculated by the compiler or possibly fixed up by linker/runtime.

Operations (Machine Independent Opcodes)

Operations can break down into the several categories. These categories can be grouped or factored into distinct, variable sized, kinds of instructions such as the following:
    Arithmetic Operations
    Arithmetic With Overflow Operations
    Logical Operations
    Pointer Operations
    Structure Operations
    Object Operations
      Allocation
      Calls (Virtual, Instance)
      Field Access/Update Array Operations
  Allocation
  Read/Write
  Read/Write without Bounds Check
  Length Operation
Vector Operations
Branch Operations
Call Operations
Intrinsic Call Operations
Return Operation
Switch Operation
Exception Operations
Type Conversions (Dynamic/Static Casts)
Type Test Operations
Security Operations
Threading Operations
Sync Operations
Checking Operations
  Null Pointer Check Operations
  Bounds Check Operations
  Type Test Operations
Outline Pseudo Operation
Data Operations Blocks When the flow graph is present, special block pseudo instructions can denote the beginning and end of basic blocks.

Labels

Labels may be user defined or compiler generated.

Pragmas

Pragmas may be user defined or compiler generated.

Annotations

Annotations may be user defined or compiler generated. Typically, they carry additional semantic information that native compilers and JIT compilers can use to improve code quality.

Lists

List IR nodes can be auxiliary nodes used to create linkage in the flow specified by control instructions.

Branch List

Branch list nodes can be attached to labels and denote all of the reaching branches.

Case List

Case list nodes can be attached to switch operations and denote all of the case values and branches.

Debug Information (Lines and Columns)

Every instruction can carry debug information depicting source line and column information. When expanding/lowering code or doing optimization, this information can be maintained for debugging purposes.

Type System

The IR can also include a representation of types for checking consistency in the various forms of the IR. Specifically, a typed intermediate language can be provided that is suitable for use in representing programs written in multiple source languages including typed and untyped languages, loosely and strongly typed languages, and languages with and without garbage collection. Additionally, a type-checker architecture can be provided in an SDA that allows use of different types and type-checking rules, depending on the source language for a program component and/or the stage of compilation.

For example, it may be desirable to have a high-level optimizer applied to programs written in a variety of languages. These languages may have different primitive types and primitive operations. One language may contain types and operations for complex arithmetic, for example, whereas another language may contain types and operations specific to computer graphics. By allowing the intermediate representation to be parameterized by different type systems, the optimizer can be used for languages with different primitive types and operations.

Another example can include a program where certain components are written in a strongly-typed subset of a language and other components are written in the full language, which is not type-safe. It is desirable to have more error checking for the first set of components. This can be accomplished by using different type-checking rules for the different components.

Yet another example is dropping type information during compilation. The type-checker and compiler can allow type information to be dropped at later stages, while forcing precise information to be maintained during earlier stages. This can be accomplished by using an unknown type in combination with different type-checking rules for different stages of compilation.

In one embodiment of an SDA, a number of type representations can be defined in a type class hierarchy such that type systems of various languages can be represented by a typed IR. An abstract base class may be defined as 'Phx::Type' for all types. The base class can contain, for instance, size information 'sizekind' for the various types, such as actual, symbolic or unknown (or variable) types. The base class can also contain 'typekind' in order to designate type classification. Additionally, an external type can be provided as an abstract type that wraps an externally defined type in order to provide back mapping from the typed IR to the original source code.

Below the base class, a class defined as 'Phx: PtrType' can represent pointer types. Various kinds of pointers can be defined as well. For instance, a managed, garbage collected pointer (points to a location within a garbage collected object), a: managed, non-garbage collected pointer (points to a location within a non-garbage collected object), an unmanaged pointer (such as would be found in code written in C++, for instance), a reference pointer (points to the base of a garbage collected object), and null.

At the same level in the hierarchy, a class defined as 'Phx::ContainerType' can represent container types, such as types that contain internal members. The internal members can have fields, methods and other types. A class defined as 'Phx: FuncType' can represent function types, including any necessary calling conventions, lists of arguments and lists of return types. Also, a class defined as 'Phx::UnmgdArrayType' can represent unmanaged array types. Under 'Phx::ContainerType' in the hierarchy, four more classes can be defined. A class defined as 'Phx::ClassType' can represent class types, a class defined as 'Phx::StructType' can represent struct types, a class defined as 'Phx::InterfaceType' can represent interface types, and a class defined as 'Phx::EnumType' can represent enumerated types. Under 'Phx::ClassType' in the hierarchy, an additional class defined as 'Phx::MgdArrayType' can represent managed array types.

A class 'primtype' may be defined as a special instance of a struct type. 'primtype' can include various types such as int, float, unknown, void, condition code, unsigned int, xint, etc. These representations can be used in both a HIR or LIR of the typed IR.

Additionally, target specific primitive types can be included in the type representation. Some languages have complex arithmetic types that can be handled efficiently if the type system is made aware of them. Take for instance an 'MMX' instruction. Such an instruction is one of a set of extra instructions built into some versions of x86 processors for supporting single instruction/multiple data operations on multimedia and communications data types. The type system can be customized to recognize and use these instructions with minimal alteration of the type representations.

The embodiment of the type representation of types described above can also includes an "unknown" type, which can represent any type and optionally has a size associated with it. The size may be the size of the machine representation of the value. An unknown type allows a compiler to drop type information in a controlled manner by changing the type information from a specific type to an unknown type. It allows the compiler to generate code that depends on the size of the value being manipulated, even when the type is unknown. Other types may use unknown types, so the unknown type also allows the representation of partial type information (where some but not all information is known).

For instance, assume a pointer to an int type. At some stage of lowering, it may be desirable to drop the type information, int. The unknown type allows the compiler to replace the int type with the unknown type. The type-checker then need not check that the pointer of interest is pointing to a correct type. It essentially takes the chance the value pointed to will be handed in such a manner as to not adversely affect the program functionality at runtime.

Another example of using an unknown type is for defining a type for a function. If a function with an argument of type pointer to unknown is called, where the argument previously had the type pointer to int, the compiler must trust that right type is being passed. The result of dereferencing the pointer may or may not be known to be an int; however, it will be used as an int. A more complex example is the introduction of an intermediate temporary variable during the conversion from high-level to low-level intermediate representation of a virtual function call. Virtual tables (vtables) are widely used to implement virtual calls in object-oriented languages. The first step in making a virtual function call in the low-level intermediate representation is to fetch the first field of an object of memory. The first field contains a pointer to a vtable. The result of fetch is then assigned to a temporary variable. Constructing the type of the temporary variable (a type that represents a pointer to a vtable, where the vtable may have many fields), may be complex and burdensome to represent. Instead, the compiler may simply assign the intermediate temporary variable "pointer to unknown." Thus, the use of the unknown type simplifies latter stages of compilation where keeping detailed type information is unnecessary or may represent a significant burden to the compiler implementer.

FIG. 7 illustrates one embodiment of a compiler system for type-checking the IR at various stages of compilation, and therefore, type-checking a typed IR at various levels of lowering. Source code 700 represents any one of a variety of source languages. The source code 700 is translated into a HIR of the typed IR 702. In doing so, the type representations of the source language are translated into the type representations internal to the typed IR.

The HIR is lowered throughout the compilation process. For purposes of this illustration, high (HIR) 702, mid (MIR) 704, and low (LIR) 706 level representations are shown. However, the embodiment is not so limited. Any number of stages of compilation may be type-checked.

The IR at each level of representation may be type-checked by type-checker 708. The type-checker 708 implements an algorithm or procedure for applying one or more rule sets 710 to each stage of the compilation process, and therefore to each representation of the IR. The rule sets 710 are selected based upon varying properties, such as the source language, stage of compilation, what strength of typing; etc.

For example, assume source code 700 contains code authored in the C++ programming language. The C++ source code 700 is first translated into an HIR 702 of the typed IR. If desired, at this point the type-checker 708 can interact with the HIR 702 in order to determine any number of properties. Such properties might include the stage of compilation (HIR), the type of source code present (C++), whether or not the language is typed (yes), whether it is loosely or strongly typed (loosely) etc. Based on the properties, the type-checker can select an appropriate set of rules. Once a rule set is selected, the type-checker type-checks the HIR according to that set of rules. Once the HIR is lowered to MIR or LIR, the properties will be accessed again and the same or a different set of rules may be appropriate.

In one embodiment, three sets of type-checking rules can be supplied to the type-checker. One set can correspond to "strong" type-checking, such as would be desirable to type-check C# or CIL. Another set can correspond to "weak" type-checking, which would be a looser type-checking than the "strong" type-checking. For instance, the weak type-checking rule set could permit type casts. A type cast is when a variable of one type is made to act like another for a single use. For instance, a variable of type int can be made to act like a char (character). The following code uses a type cast to print the letter 'P'.

int a;
a=80;
cout<<(char) a;

Thus, even though 'a' is defined as type int and assigned the value 80, the cout statement will treat the variable 'a' as type char due to the type cast and therefore display a 'P' (ASCII value 80) rather than 80.

Lastly, a set can correspond to "representation" checking. The "representation" checking can allow dropped type information in parts of the intermediate program representation, such as by using an unknown type, and can include rules that dictate when such type information can be dropped or when an unknown type can be substituted for another type. For instance, the result of a function that returns a value of type Void may be prohibited from being assigned to a variable of unknown type.

Additionally, more than one set of rules can be used at a single stage of compilation. For instance, assume the source code 700 contains a single language, but contains sections that are strongly typed and some sections that are loosely typed. The type-checker can use one set of rules for the HIR at certain strongly typed sections, and another set of rules for code sections that are loosely typed.

Figure 8:
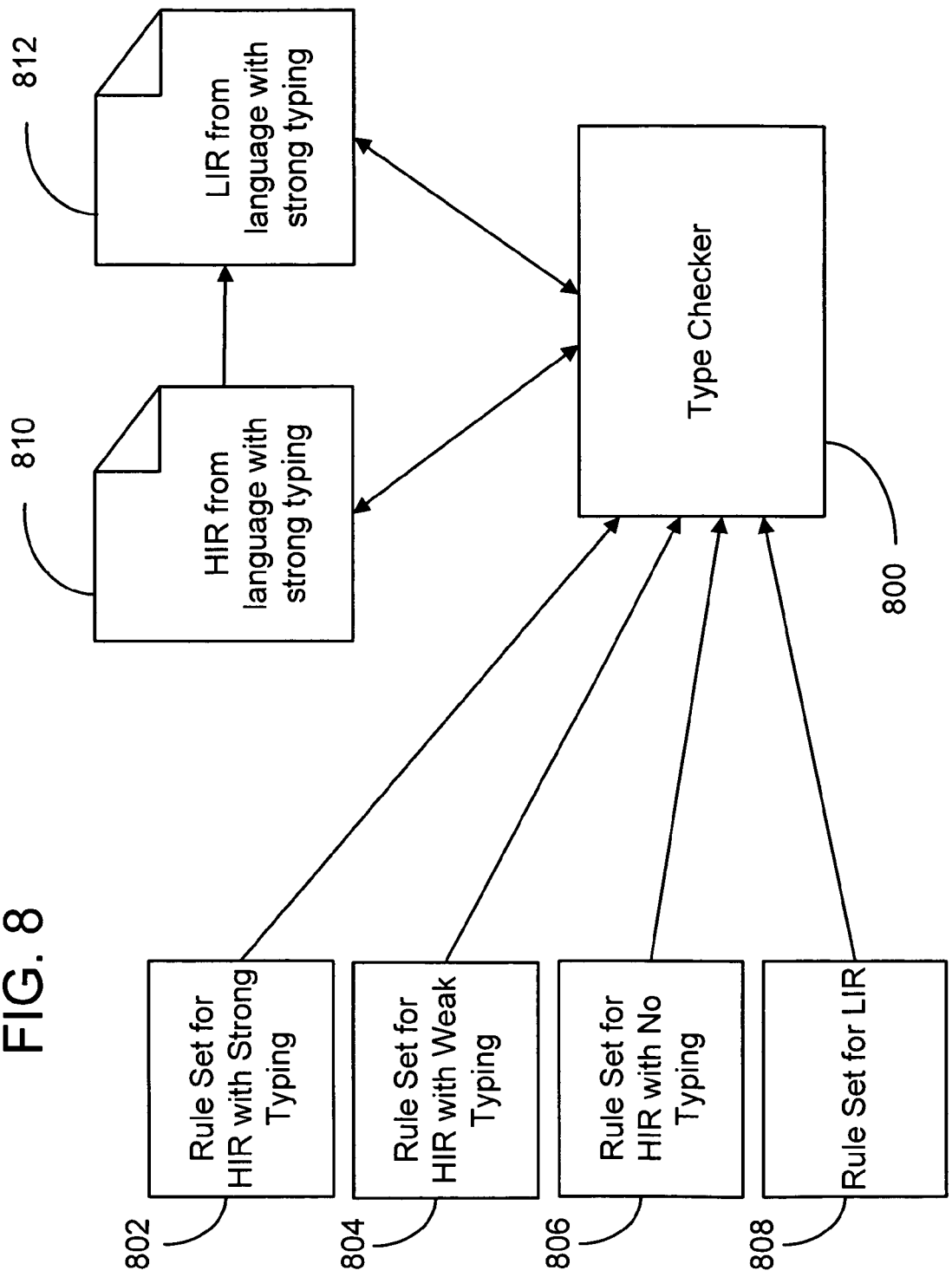
FIG. 8 is a block diagram of a type-checker for use with an IR.

FIG. 8 is a block diagram of a type-checker for use in with an IR as described herein. Type-checker 800 can accept as input any number of rules sets corresponding to different source languages and/or different stages of compilation. In FIG. 8, four rules sets 802-808 are provided to type-checker 800. Rule set 802 represents a rule set for an HIR for languages with strong typing, rule set 804 represents a rule set for an HIR for languages with weak typing, rule set 806 represents a rule set for an HIR for languages with no typing, and rule set 808 represents a rule set for an LIR. Program module 810 represents a language with strong typing in a HIR, and program module 812 represents program module 810 after being lowered to an LIR.

The type-checker 800 selects an appropriate rule set based on properties of the program module being type-checked and applies the selected rule set to the program module using an incorporated procedure or algorithm. For instance, type-checker 800 may select rule set 802 (representing a rule set for an HIR for languages with strong typing) in order to type-check program module 810 (representing a language with strong typing in a HIR). Subsequently, the type-checker 800 may then select rule set 808 (representing a rule set for an LIR) in order to type-check program module 812 (representing a language with strong typing in a LIR).

The rule sets of the type-checking system described are easily extended to entirely new languages, and also to new features of existing languages. For instance, should a new language be introduced, a new rule set is simply authored for the new language. Since the rule sets are separate from the type-checker or compiler system itself and are designed to accept the rule sets as separate entities, new rule sets for new languages can be distributed without having to re-distribute or update existing type-checking systems or compilers. Likewise, if a new feature is added to an existing language, such as adding XML support to C++ for instance, the rule set corresponding to C++ at the various stages of compilation can be easily reconfigured dynamically to handle the new feature. Again, no new core system need be updated or distributed.

The rule sets can also allow for constraints on types. For instance, whether sub-typing is allowed for a particular type when a class inherits from another may be a constraint described in the rules. Another constraint may be a boxed constraint, such as might be desired to indicate data can be converted into a virtual table containing the data. Others may include a size constraint, or a primitive type constraint indicating the necessity for identical types of primitives. Like any other part of the rule set, new constraints can be added as desired.

The set of rules used by the type-checker can be constructed through a programming interface to an application for authoring the rule sets. The application can construct the rules such that the rule set is represented in a hierarchy of type primitives with rules assigned to individual instructions of the typed IR. The hierarchy can be provided in the form of a type graph that will explicitly express various elements of types relevant to a particular program module or compilation unit. The IR elements such as symbols and operations will be associated with elements of the type systems. The type graph nodes will describe the primitive and constructed types and their relationships such as components, nested types, function signatures, interface types, elements of hierarchy and other information such as source names and references to module/assembly external type elements.

Exception Handling

An IR as described herein for use with an SDA can support a variety of language specific exception handling models, such as C++, Microsoft CLR, and the Microsoft Windows' structured exception handling (SEH).

Figure 9:
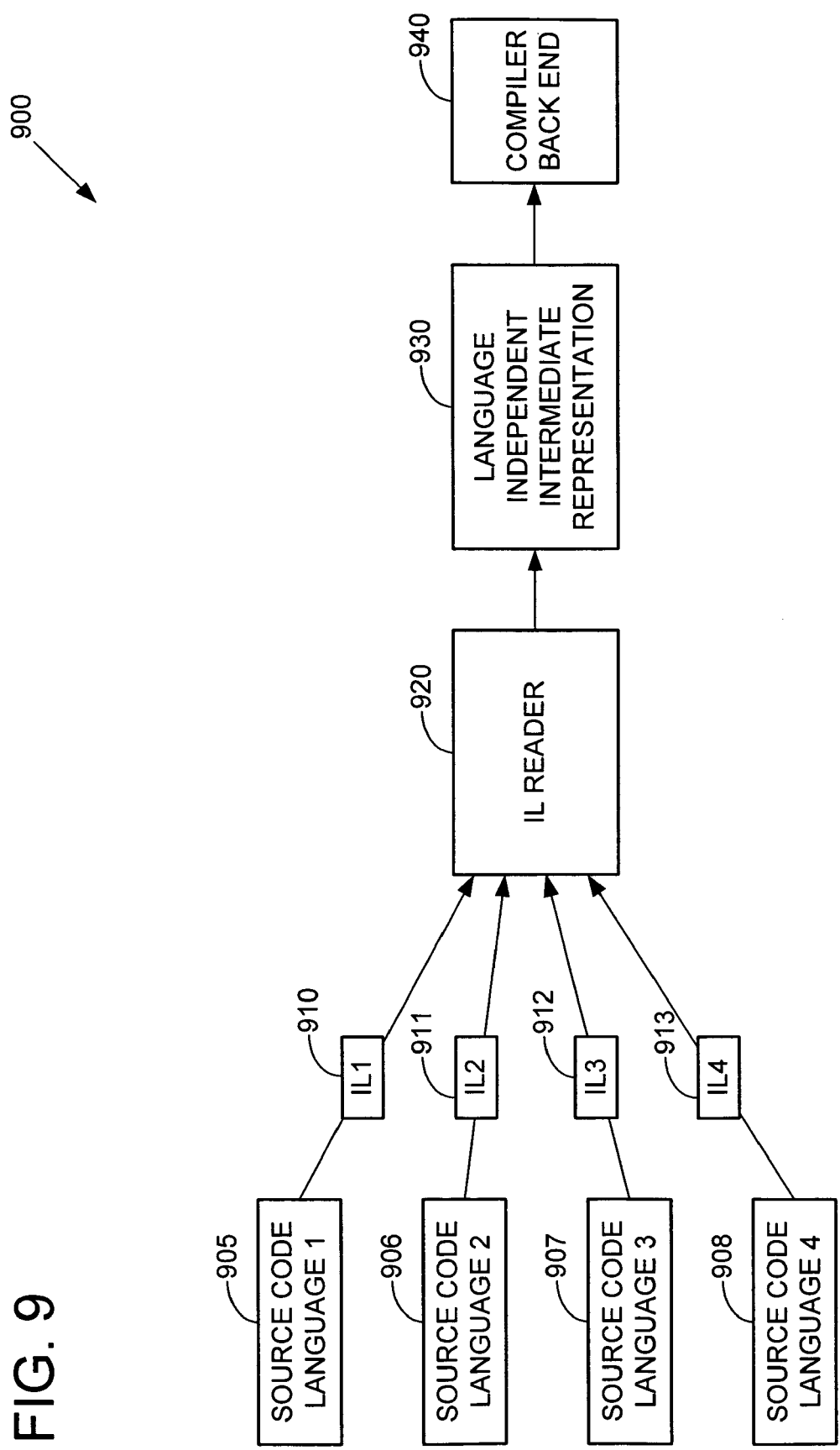
FIG. 9 illustrates a system for implementing uniform exception handling in an IR.

FIG. 9 illustrates a system 900 for implementing uniform exception handling in an IR 930 for multiple source languages (905-908) by the compiler back end 940. As shown in FIG. 9, the system 900 includes an intermediate language (IL) representation 910-913 for each of the multiple source code representations 905-908 which is parsed or read by an IL reader 920 which translates the multiple IL representations 910-913 to a single IR 930. The IL representation is a higher-level intermediate representation than the IR 930 and may be expressed in any number of well known intermediate languages such as CIL (Microsoft CLR) (for C#, Visual Basic, JScript, C, and FORTRAN) and C++ IL (for C++). Even though the system 900 for generating a uniform exception handling framework for multiple languages is shown as having a single IL reader process for multiple source languages, it is possible to implement multiple such readers, each corresponding to one or more of the IL representations 910-913.

Figure 10:
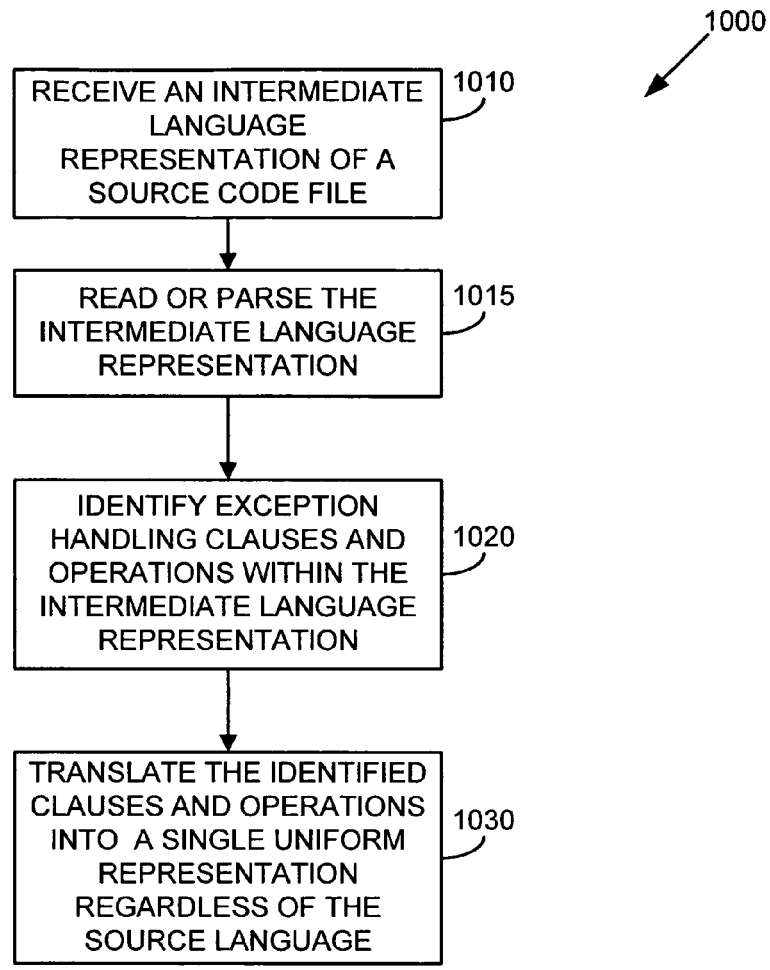
FIG. 10A illustrates a method for using an IL reader to generate a uniform set of intermediate representations for exception handling constructs.
FIG. 10B shows a method for generating an executable from the uniform IR of the software.

FIG. 10A illustrates a general overall method 1000 for using the IL reader 920 to generate a uniform set of intermediate representations for exception handling constructs expressed in a number of different source languages. At 1010, the intermediate language representation of software (e.g., an intermediate language representation of a source code file) is received by the reader 920 and at 1015, the file is read or parsed to identify exception handling constructs within the IL code stream (1020). Then at 1030, the reader 920 (which can also be thought of as a virtual machine) generates a single uniform IR of the exception handling constructs identified previously at 1020. Such an exception handling frame work can then be used to simplify the processes of a compiler back end such as code optimizations and code generation.

The uniform IR of the software having the exception handling constructs can explicitly express exception handling control of the software. FIG. 10B shows a method 1050 for generating executable from the uniform IR of the software. Such a method can be used, for example, by a compiler or other software development tool when generating an executable version (e.g., machine-specific code or other object code) for the software.

At 1060, the uniform IR is read (e.g., by a compiler or other software development tool). For example, the uniform IR generated by the method of FIG. 10A can be used. Other transformations, translations, or optimizations to the uniform intermediate representation can be performed as desired.

At 1070, a computer-executable version of the software is generated (e.g., by the compiler or other software development tool). The computer-executable version of the software implements the exception handling control flow of the software, based on the uniform IR.

Figure 11:
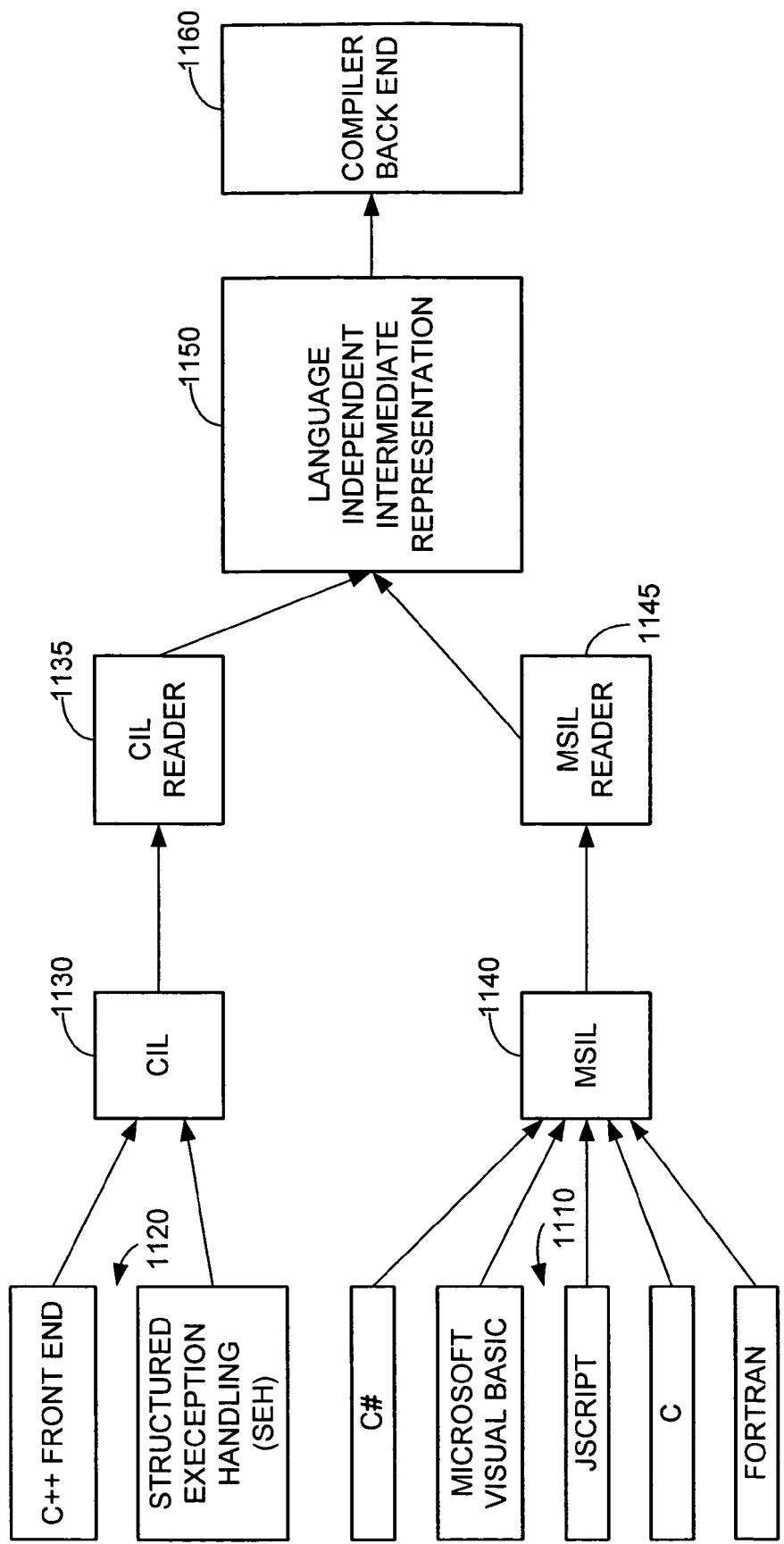
FIG. 11 is a block diagram of a system for generating a simple and uniform IR of exception handling constructs within multiple source languages expressed in the form of multiple IL representations.

FIG. 11 illustrates another embodiment of a system for generating a simple and uniform IR of exception handling constructs within multiple source languages expressed in the form of multiple IL representations. As shown in FIG. 11, the source language group 1110 supported within Microsoft's .NET framework (e.g., C#, C, Microsoft Visual Basic, Jscript, and FORTRAN) are first translated to a CIL representation 1140. However, because of its differences with other source languages C++ is expressed in another intermediate language known as CIL 1130. The control flow and the exception handling models within the C++ IL and CIL are expressed in fundamentally different ways and thus it may be necessary to provide separate IL readers (1135 and 1145) for C++ IL and CIL representations.

Both the readers 1135 and 1145 may use appropriate algorithms implemented within their respective readers to parse or read their respective intermediate language code streams to express the exception handling constructs or instructions or expressions within the intermediate language code stream using a uniform framework of exception handling instructions 1150 to be provided to the back end 1160.

Code Generation

Figure 12:
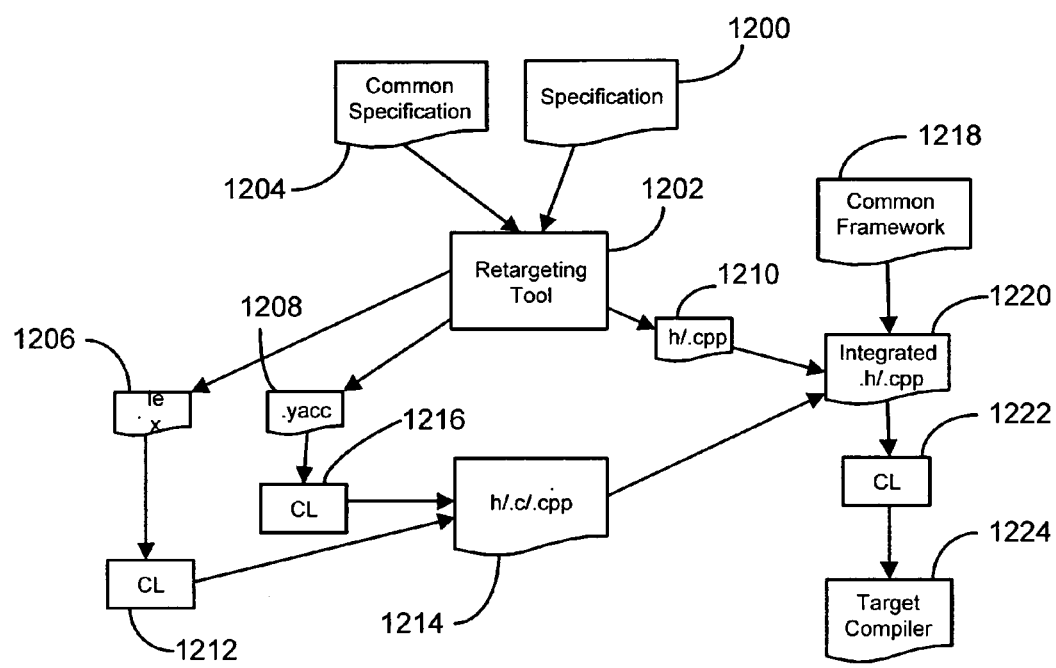
FIG. 12 is a block diagram of a system for code generation.

In order to use an SDA to produce a software development tool for any number of execution architectures, the SDA can contain a code generator capable of producing any number of machine dependent representations from a common IR. An embodiment of a system for such code generation is illustrated in FIG. 12. In the example, a target execution architecture specification 1200 with target specific data is supplied to a retargeting tool 1202. Alternatively, both the specification 1200, and a second specification 1204 with target agnostic data, can be supplied to the retargeting tool 1202.

The retargeting tool 1202 is software that parses the specification(s) 1200/1204 for data relating to one or more code generation components. Based upon the data in the specification(s) 1200/1204, the retargeting tool creates one or more components. Each component provides data creating code generation components.

For instance, in the embodiment of FIG. 12, a tokenization grammar 1206 (e.g., in lex format), and a parser grammar 1208 (e.g., in yacc format), and series of C source and header files 1210 are produced.

In an example using lex, the tokenization grammar 1206 is provided to a lex compiler 1212 for creating the source code and header files 1214 necessary to produce a lexical analysis component of a compiler. Lex is a language designed specifically for creating compiler lexical analysis components.

In an example using yacc, the parser grammar 1208 is provided to a yacc compiler 1216 for creating the source code and header files 1214 necessary to produce a syntactical analysis component of a compiler. Yacc provides a general tool specifying the structures of source code input, together with code to be invoked as each such structure is recognized.

The source code ultimately responsible for producing the components necessary for building the software development tool is produced by integrating the series of C source and header files 1210/1214 produced by the retargeting tool with a common framework 1218 contained within a configuration of an SDA. For instance, lexical and syntactical analysis components are produced by compiling the integration of the series of C source and header files 1214 with common framework source code and the header files 1218. Likewise, other software development tool components can be produced by compiling the integration of the series of C source and header files 1210 with common framework source code and header files 1218.

Thus, the source code 1220 representing an integration of C source and header files 1210/1214 and common framework source code and header files 1218 is provided to compiler 1222 to produce the compiler 1224 targeted for the target execution architecture described in specification 1200 that conforms to the common framework within the SDA.

As described above, software development tool components include legalization tables. Such tables include information sufficient to identify the specific form of a target instruction. The legalization framework can provide a form index that is used by the instruction selection, instruction legalization, encoding, and listing components.

Figure 13:
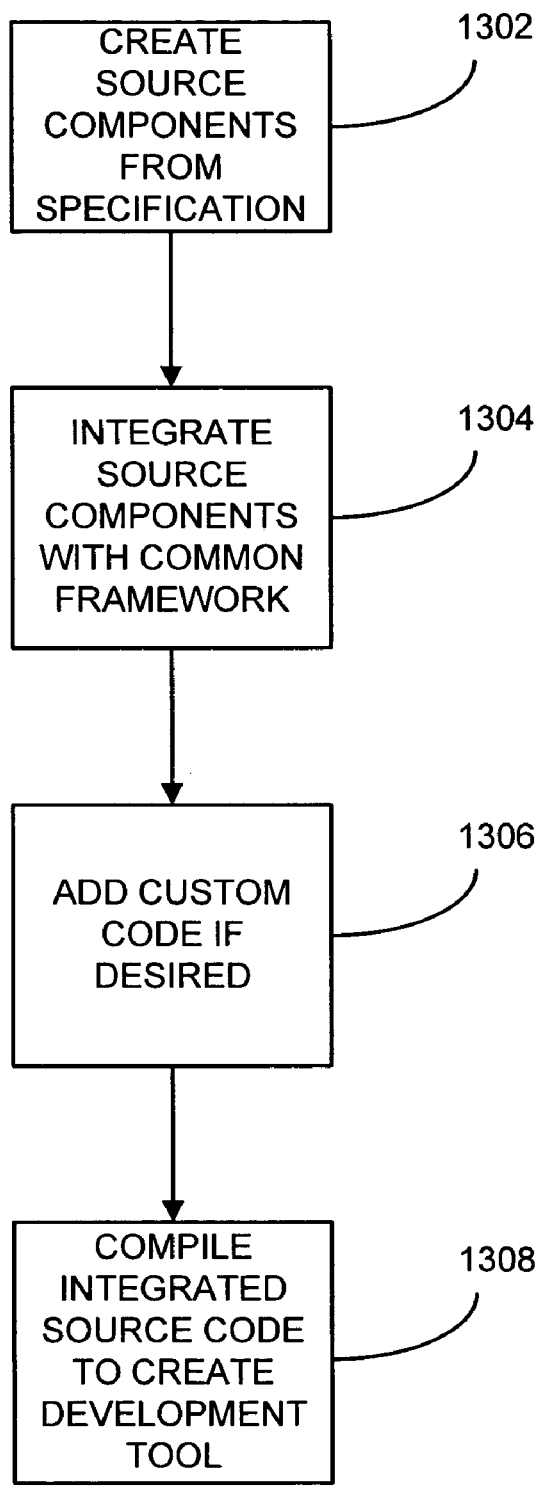
FIG. 13 is a flowchart of an embodiment of a method implemented in software for code generation.

FIG. 13 is a flowchart of an embodiment of a method implemented in software for code generation suitable for use with the technologies described herein. A target execution architecture specification is processed at 1302 to create a number of components represented by source code. The source components are then integrated into a framework represented by source code at 1304. The framework can be provided by or contained with an SDA core. If desired, custom code can be included as well at block 1306. The integrated source code is then compiled at block 1308 to create a software development tool from the code generation components.

Core Data Structure Extensions

Figure 14A:
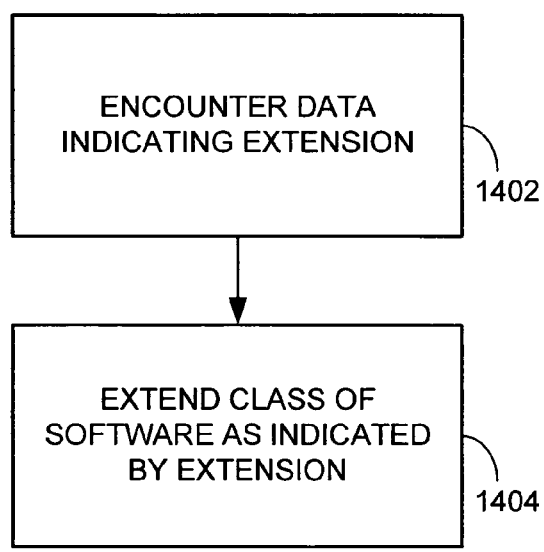
FIG. 14A depicts an overall process for extending a core class definition for building a tool by extending a core framework.

In another embodiment of an SDA, a method and system are provided for extensibly configuring the SDA core data structures whose extension fields may be dependent on a software development scenario, which configuration of the SDA is being constructed, or any other factor depending from the individual desired characteristics of the target software development tool. FIG. 14A depicts an overall process for extending a core class definition for building a tool by extending a core framework. First, data indicating an extension is encountered at 1402 and at 1404 the class of the software development tool is extended as indicated by the extension.

Figure 14B:
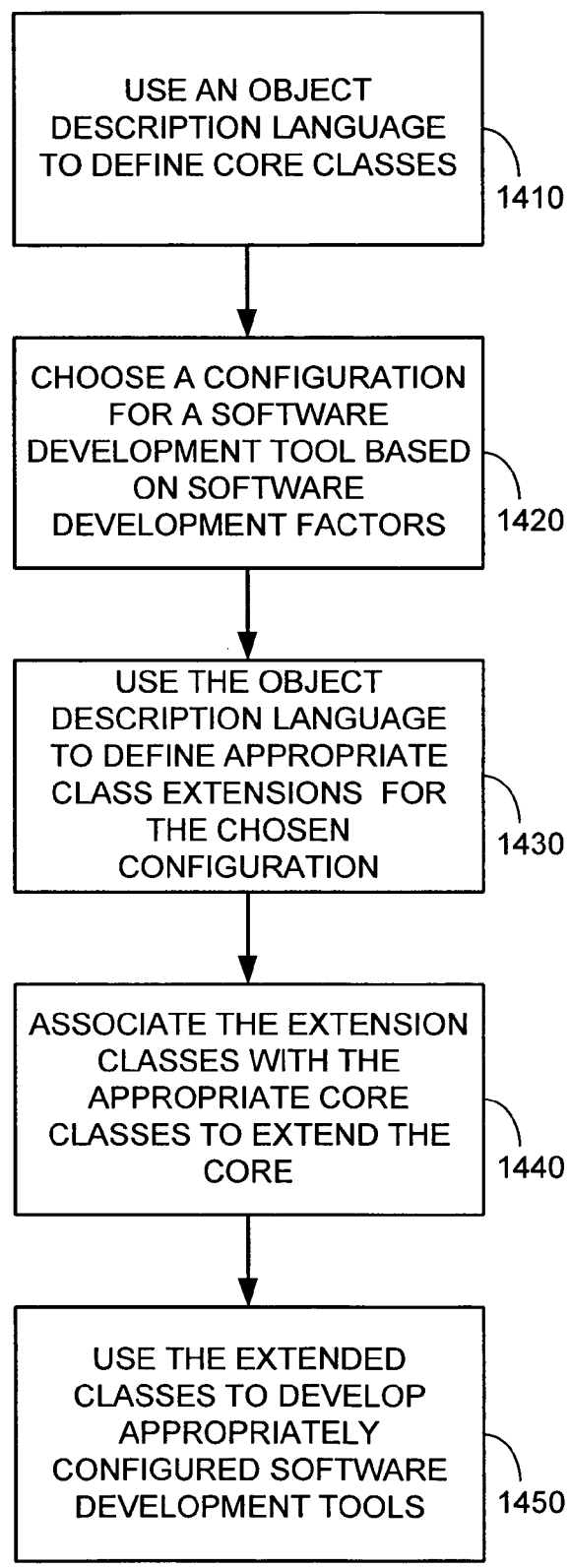
FIG. 14B describes an overall process for building a software development tool by using software scenario dependent extensions for extending an SDA core framework.

FIG. 14B describes an overall process for building a software development tool by using software scenario dependent extensions for extending an SDA core framework. At 1410, a simplified object definition language (ODL) may be used to define the core classes. Then at 1420, the configuration for a particular SDA may be determined based on any number of factors, such as a software development scenario. The software development scenario might indicate a type of software development tool being created, the target execution architecture, the target input language, etc. Then, based on some or all of the factors considered, the object description language may be used to define the extensions at 1430 to represent the additional or different class members needed to extend the core class.

At 1440, the extension may be associated with a core class to appropriately extend the core class definition. The syntax for the object description language should provide for defining core classes as being extensible or not, and further to associate a particular set of extension class members as extensions of a selected core class. Furthermore, a preprocessor translation program may be used to translate the data or the object description language to a programming language. After such pre-processing, at 1450, the extended class definition may be compiled further and used to implement other software development tools of a particular configuration by extending a core framework.

Using the process above, multiple different definitions of extensions can be provided separately and each extension can simply extend the core or the base class as necessary without having to maintain any complex inheritance relationships. The programmers providing a particular extension of a core class need not be aware of the other extensions of the core class. This not only simplifies the task of defining the extensions, but also, the users of the extended core class need only be aware of core class names to use the extended core class. Thus, the programmers can be freed from the task of remembering complex hierarchical relationships among class definitions when using extended class definitions.

Figure 15A:
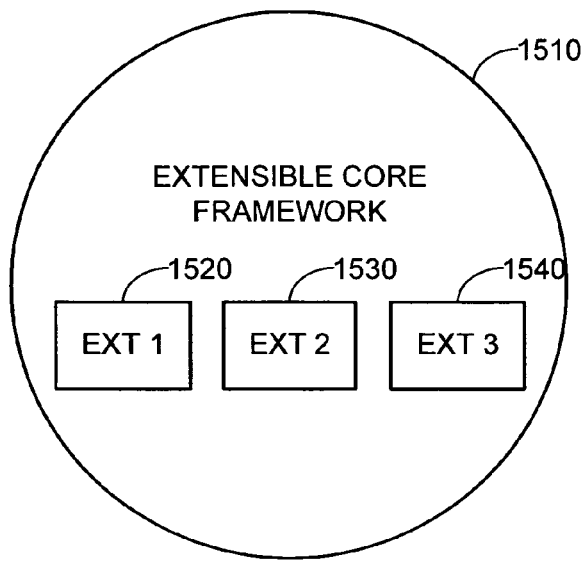
FIG. 15A illustrates an approach whereby extensions are added to a core compiler framework in order to extend it.

One approach for extending a core framework program may be to obtain access to the source code files of the core program and to statically extend the core classes as needed by using the object description language to define the extensions, which may then be processed to automatically inject the extensions to the core classes to generate extended classes. Alternatively, the extended classes may be generated by manually adding the extensions directly to the source code in a source code language. FIG. 15A illustrates this approach whereby the extensions 1520, 1530 and 1540 are added to the core framework file 1510 in order to extend it and then the extensions 1520, 1530 and 1540 are compiled as part of the now extended core framework file 1510.

Figure 15B:
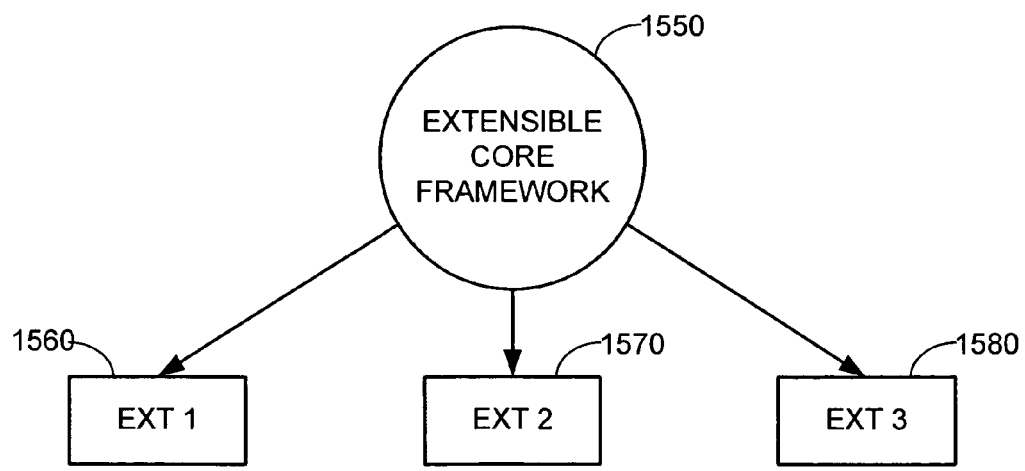
FIG. 15B illustrates an approach whereby a core compiler framework is compiled as a separate file from extensions.

However, this approach may not be suitable for all purposes because the programmers providing the definition of the extensions such as 1520, 1530 and 1540 will need to have access to the source code of the core framework 1510. This may not be desirable in circumstances where the providers of the core framework 1510 wish to keep the core framework source code secret. In that case, the second approach depicted in FIG. 15B may be used, whereby the core compiler framework 1550 is compiled as a separate file from the extensions 1560, 1570, and 1580. In the second approach, the extensions 1560, 1570 and 1580, and the core framework 1550 may be adapted to have links to each other such that at runtime the extensions are linked to the core framework to appropriately extend the core framework. The links may be implemented as a simple linked list that specifies which extensions are to be used to extend particular core classes. This may also be achieved by using simple naming conventions that appropriately relate the extensions to the core classes as and when needed. In comparison to the first approach, this second approach may require additional overhead processing related to aspect of linking at runtime and thus, may be a slower implementation. On the other hand, this second approach does provide the flexibility of allowing extending a core class by developers not having access to the source code of the core framework.

Figure 16:
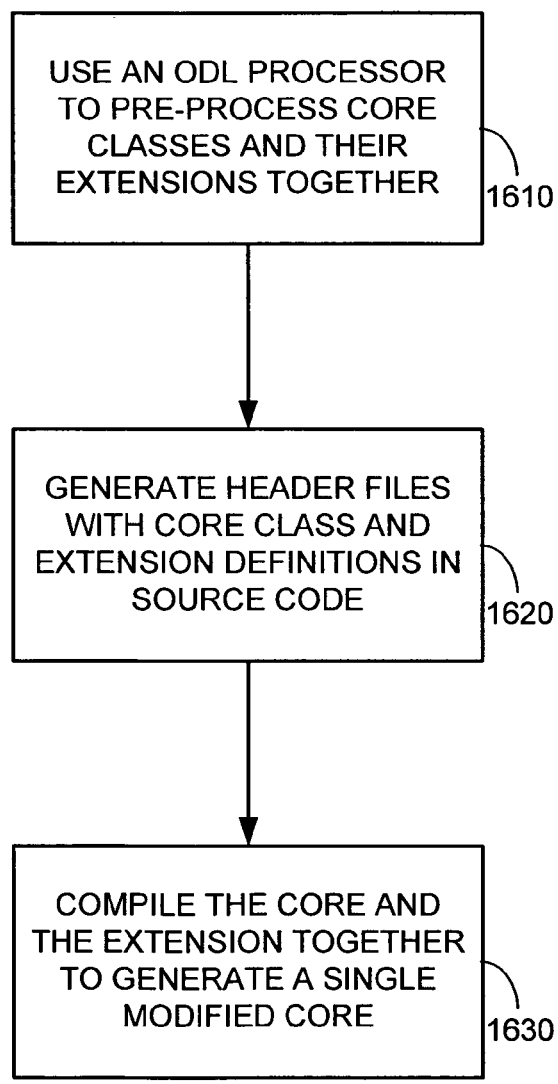
FIG. 16 illustrates a method for statically extending classes related to a core framework program prior to compile time.

FIG. 16 illustrates a method for statically extending classes related to a core framework program prior to compile time as shown with reference to FIG. 15A above. The core classes and their extensions may be defined using an object description language. The definitions of the core classes and the extensions need not be generated simultaneously or together. However, adding the extensions would require some access to the source code of the core program.

Once such class definitions are-obtained, then at 1610, the definitions of the core classes and their extensions would together be processed by an ODL pre-processor which can translate an object description language representation to a source code representation. Thus at 1620, the result of the pre-processing by the ODL processor would be a header file and possibly some other code expressing the definitions of the core classes and their extensions in a source code language such C++. Further at 1630, the header file with the extended class definitions comprising the core class members and the extension class members would then be compiled along with the rest of the code related to the now extended core framework to generate custom configured software development tools.

Figure 17:
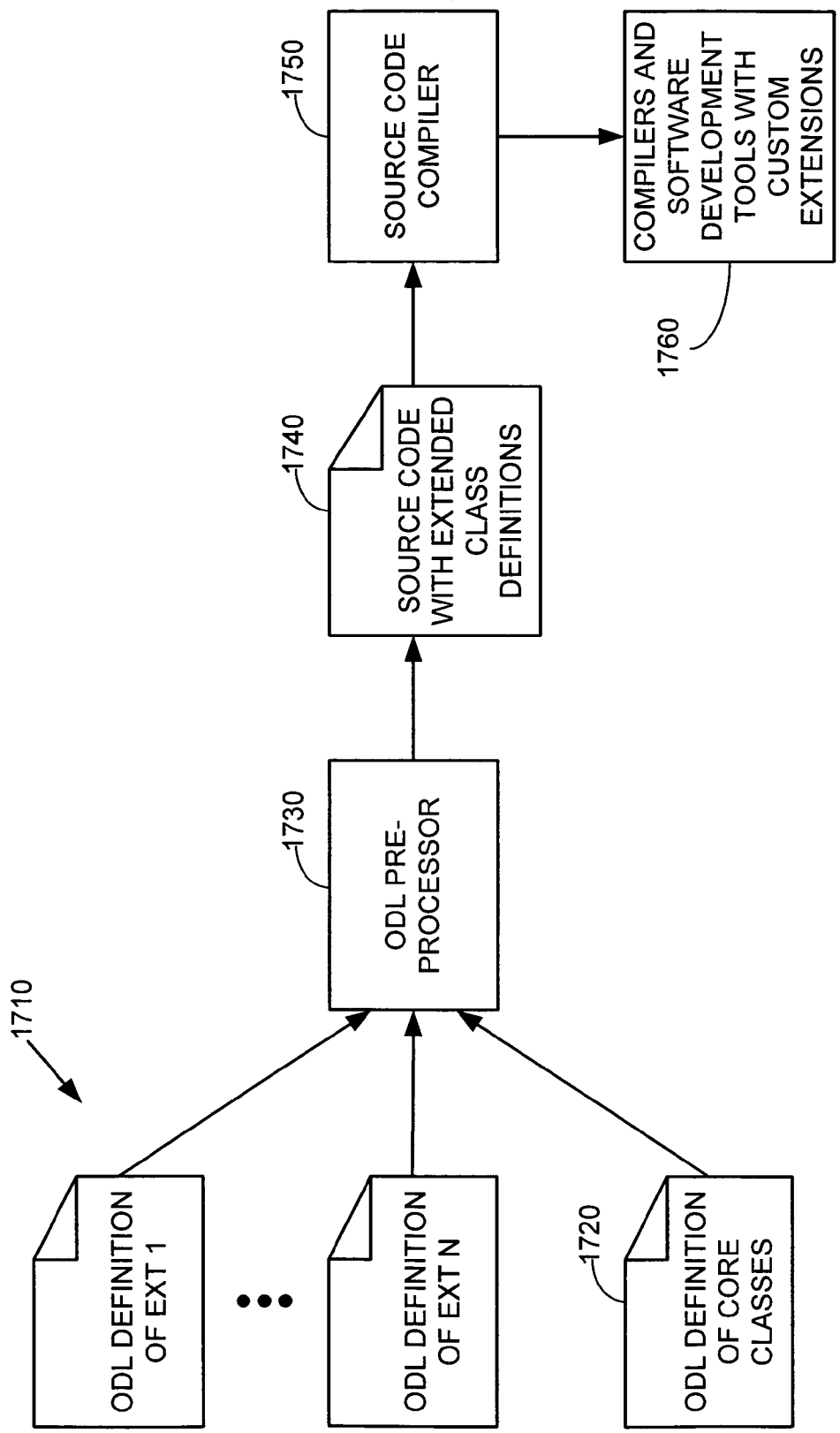
FIG. 17 illustrates an exemplary system for implementing the process of FIG. 16.

FIG. 17 illustrates an exemplary system for implementing the process of FIG. 16. As shown in FIG. 17, multiple definitions of extensions 1710 to core class definitions 1720 can be stored as object description language files. An ODL pre-processor 1730 may be provided which is capable of receiving the files 1710 and 1720 corresponding to the core class definitions and extension definitions respectively. The pre-processor should also be capable of translating the files 1710 and 1720 from their object description language form to a source code representation 1740. The source code representation can be in any language that can be eventually compiled to a form executable by a computer processor. The source code 1740 generated by the pre-processor 1730 may include header files where class definitions are typically stored. A source code compiler 1750 appropriate for the language of the source code 1740 emitted by the preprocessor 1730 may be provided for compiling the source code representation 1740 to create customized extended versions of core software programs 1760 such as compliers and other software development tools.

Figure 18:
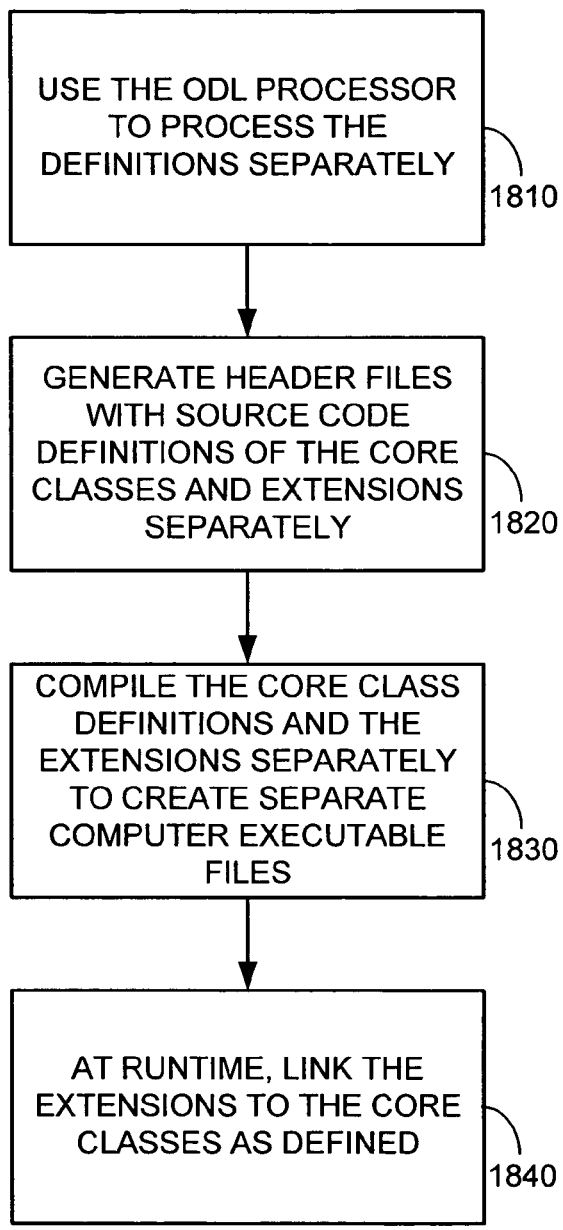
FIG. 18 illustrates a method for extending a core class definition of an extensible core framework software program by linking the extension to the appropriate core classes at runtime.

FIG. 18 illustrates a method for extending a core class definition of an extensible core framework software program by linking the extension to the appropriate core classes at runtime. The core class definitions and the extensions may be expressed separately using an object description language. The description language may be suitable for expressing that a core class definition is dynamically extensible. Also, such a language may be suitable for expressing the associations between particular core class definitions and their extensions. Syntax for one such suitable language is described in further detail below. Once the definitions are expressed, an ODL pre-processor may be used at 1810 to translate the definitions in the object description language representation to a source code representation at 1820. However, unlike the static process (FIG. 16), in the dynamic process of FIG. 18, the core class definitions are not processed by the ODL pre-processor together with the definition of their extensions. Instead, source code header files corresponding to core class definitions and source code header files corresponding to class extension definitions are generated separately. These may be generated by different ODL pre-processors but it is not necessary to do so. Furthermore, at 1830, the header files containing core class definitions and the header files containing the extension definitions are compiled separately to create separate files that are executable by a computer. However, at 1840, during runtime, the class extension definitions may be linked to the appropriate core class definitions to extend the core classes as defined.

Figure 19:
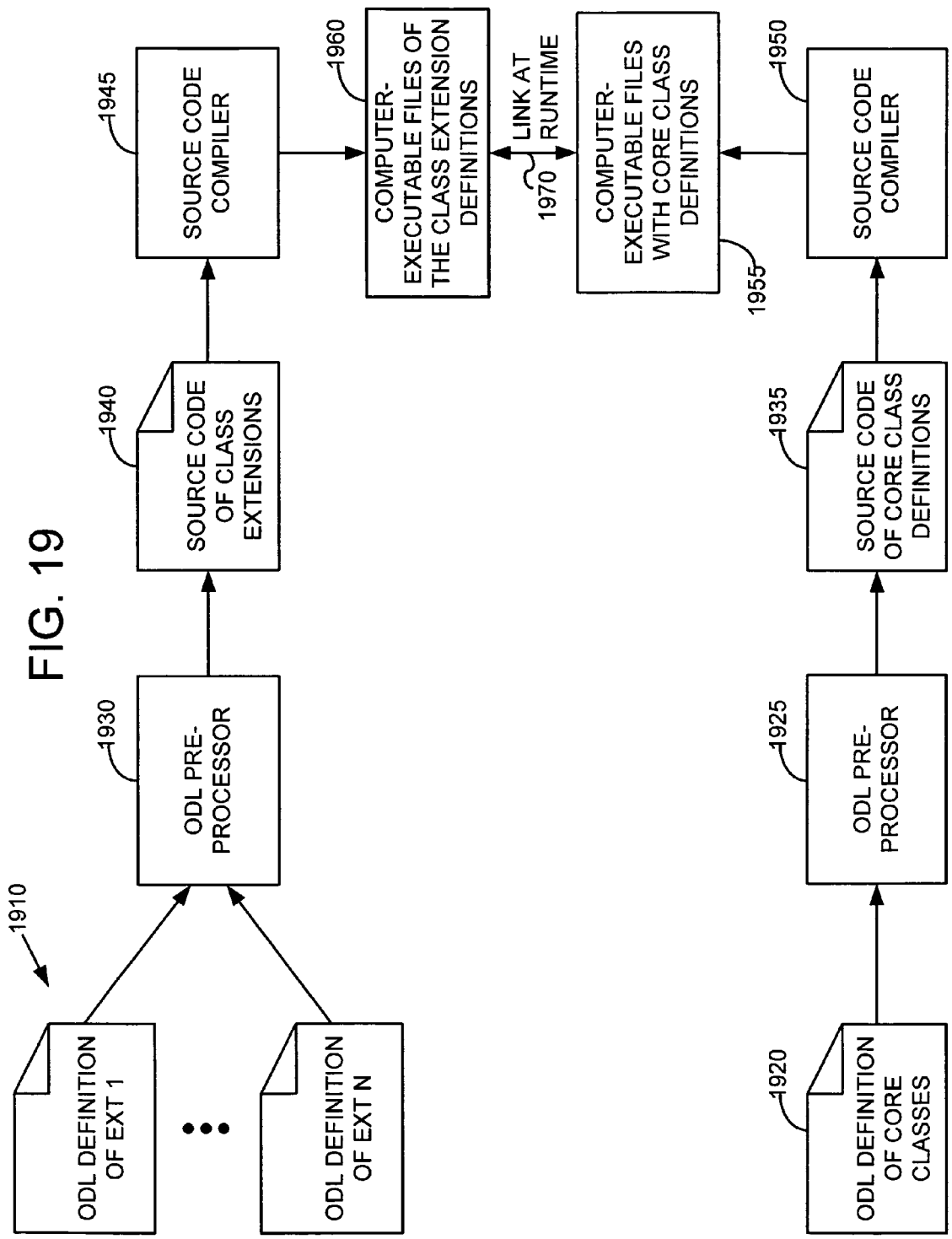
FIG. 19 illustrates an exemplary system for implementing the process of FIG. 18.

FIG. 19 illustrates an exemplary system for implementing the process of FIG. 18. As shown in FIG. 19, the class extension definitions are provided in an object description language and stored in files 1910. It is not necessary that each extension be stored as a separate file as shown. The core class definitions are also provided in an object description language and stored in files 1920. According to the process described in FIG. 18, an ODL pre-processor 1925 is provided for processing the core class definitions by translating the core class definitions from an object description language representation to a source code language representation to be stored as header files 1935. Similarly, yet another ODL pre-processor 1930 may be provided for processing the class extension files 1910 to generate source code header files 1940 comprising extensions. A source code compiler 1945 may be provided for compiling the class extension header files 1940 to generate a computer executable file 1960 containing the class extension definitions. Similarly, a source compiler 1950 may be provided for compiling the header files 1935 containing the core class definitions to generate computer executable files 1955 containing the core class definitions. Then at runtime, as the executable files corresponding to the core classes 1955 and the executable files corresponding to extension classes are executed, the links 1970 provided within the core and the extension classes can cause the core classes to be extended appropriately.

Software Deliverable

Figure 20:
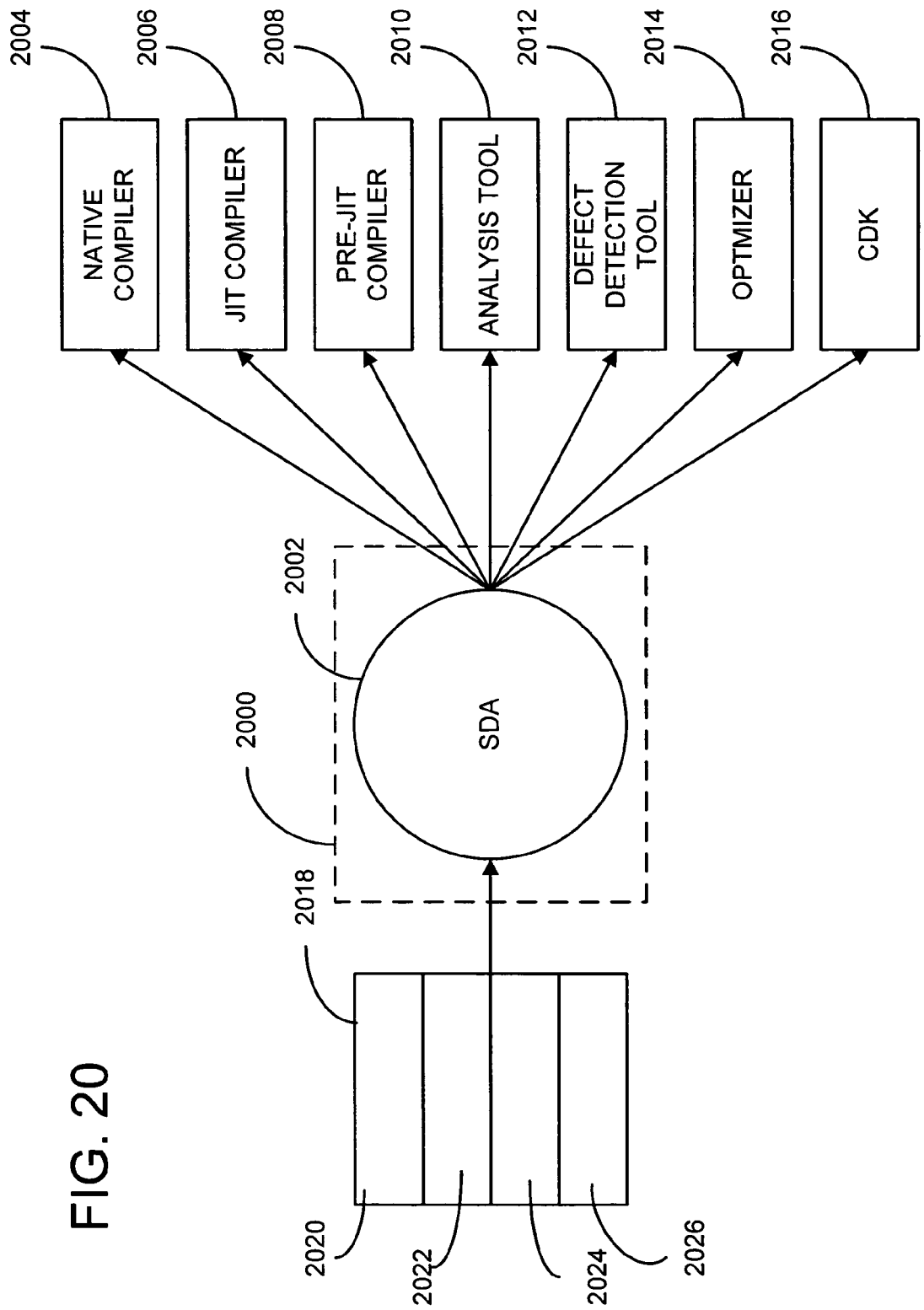
FIG. 20 is a block diagram of a computer software deliverable.

FIG. 20 is a block diagram of a computer software deliverable for the technologies described herein. Software deliverable 2000 contains an SDA 2002. The SDA 2002 can contain source code or objects for implementing one or more of the IR, exception handling model, type system, code generator, or core data structure extension technologies described herein. The SDA 2002 can be configured to produce any one of a variety of software development tools in any number of software development scenarios. The configurations can include, but are not limited to, a native compiler configuration 2004, a JIT compiler configuration 2006, a Pre-JIT compiler configuration 2008, an analysis tool configuration 2010, a defect detection configuration 2012, an optimizer configuration 2014, or a CDK configuration 2016.

The software deliverable can be executed on a suitable computer system in order to produce a target software development tool. Component(s) 2018 is provided to the software deliverable/SDA 2000/2002 on the computer system. Component(s) 2018 can include, but is not limited to, one or more of: data related to a target execution architecture 2020, a set of class extension declarations 2022, data related to an input language for the target software, development tool 2024, and one or more type rule sets 2026.

Figure 21:
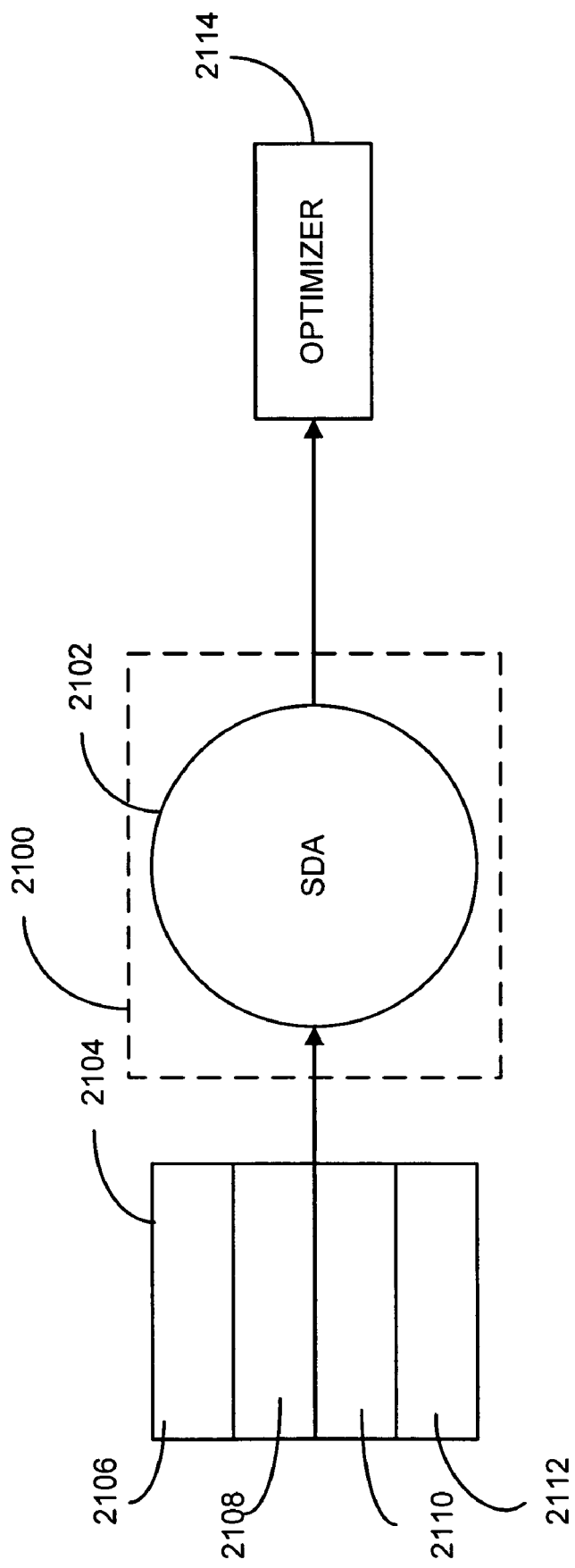
FIG. 21 is a block diagram showing a specific example of the software executable described in FIG. 20.

The software deliverable can produce a software development tool based on the selected configuration and component(s) 2018. For instance, FIG. 21 is a block diagram showing a specific example of the software executable described in FIG. 20.

Software deliverable 2100 contains an SDA 2102 in an optimizer configuration. Component(s) 2104 contains data 2106 related to an x86 architecture, a set of class extension declarations 2108 consistent with the optimizer configuration, data 2110 related to the input language C++, and three rule sets for type-checking 2112 (for instance, one set corresponding to strong type-checking, one to weak type-checking, and one to representation type-checking). The component(s) 2104 is linked to software deliverable/SDA 2100/2102 to create optimizer 2114. Optimizer 2114 takes source code written in the C++ language as an input and is targeted for the x86 architecture.

Figure 22:
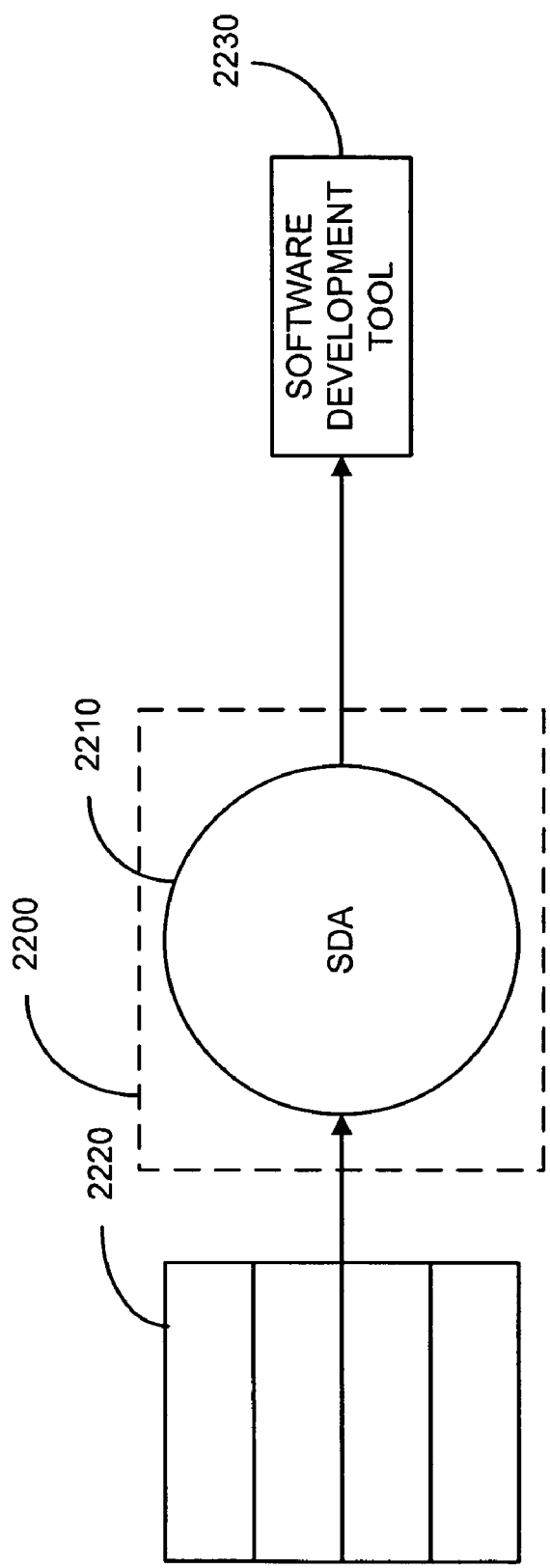
FIG. 22 shows another embodiment of a computer software deliverable.

FIG. 22 shows another embodiment of a computer software deliverable for the technologies described herein. In this embodiment, the software deliverable 2200 can be a binary or other computer-executable file version of an SDA 2210. A software development component 2220 can then be linked (e.g., dynamically) to the software deliverable 2200 (e.g., at runtime without access to source code). The resulting combination of the component and software deliverable can create a software development tool 2230.

Figure 23:
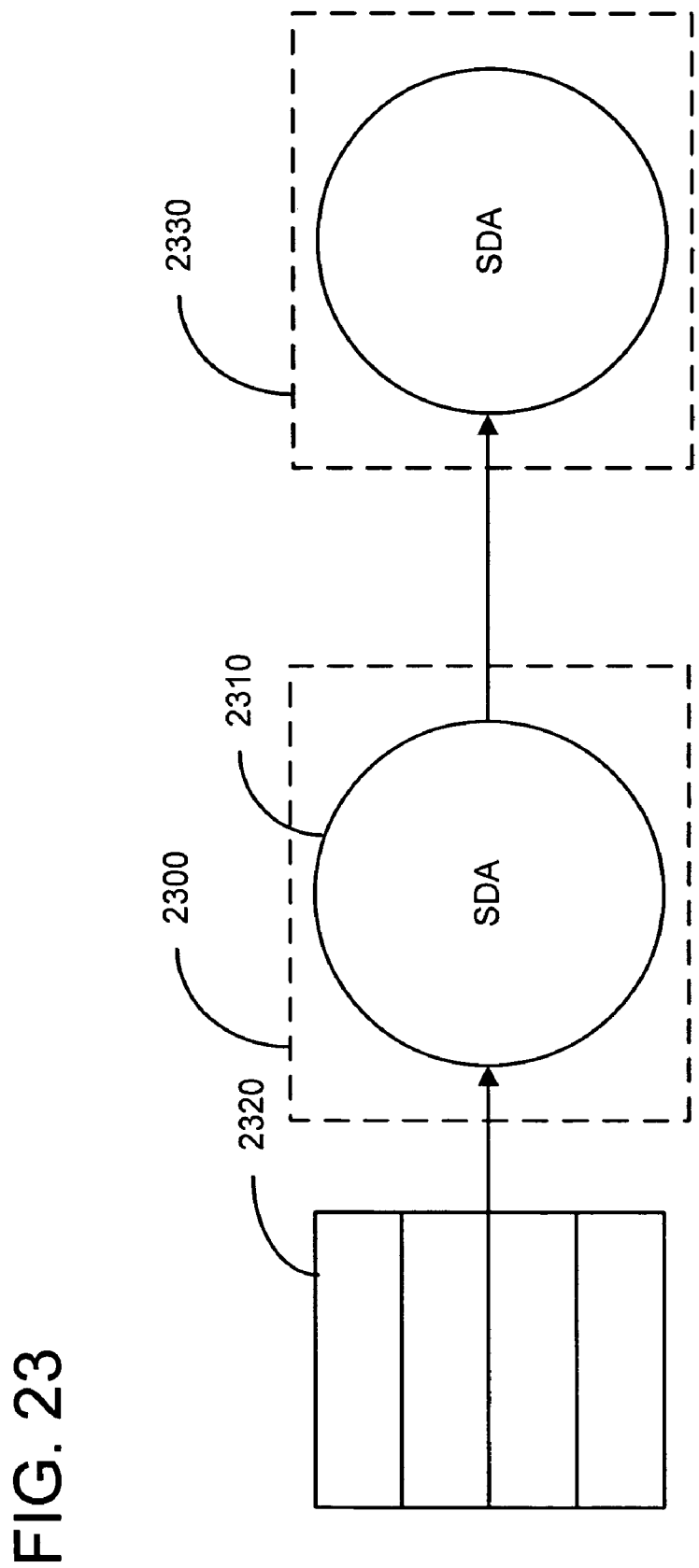
FIG. 23 shows a computer software deliverable for modifying a pre-existing software development tool.

Alternatively, a pre-existing software development tool 2300 can be modified as shown in FIG. 23. The software development tool 2300 can be produced using an SDA 2310 such as in various methods described herein. A new component 2320 can then be created and linked to SDA 2310 in order to create a modified version of the software development tool 2330.

Figure 24:
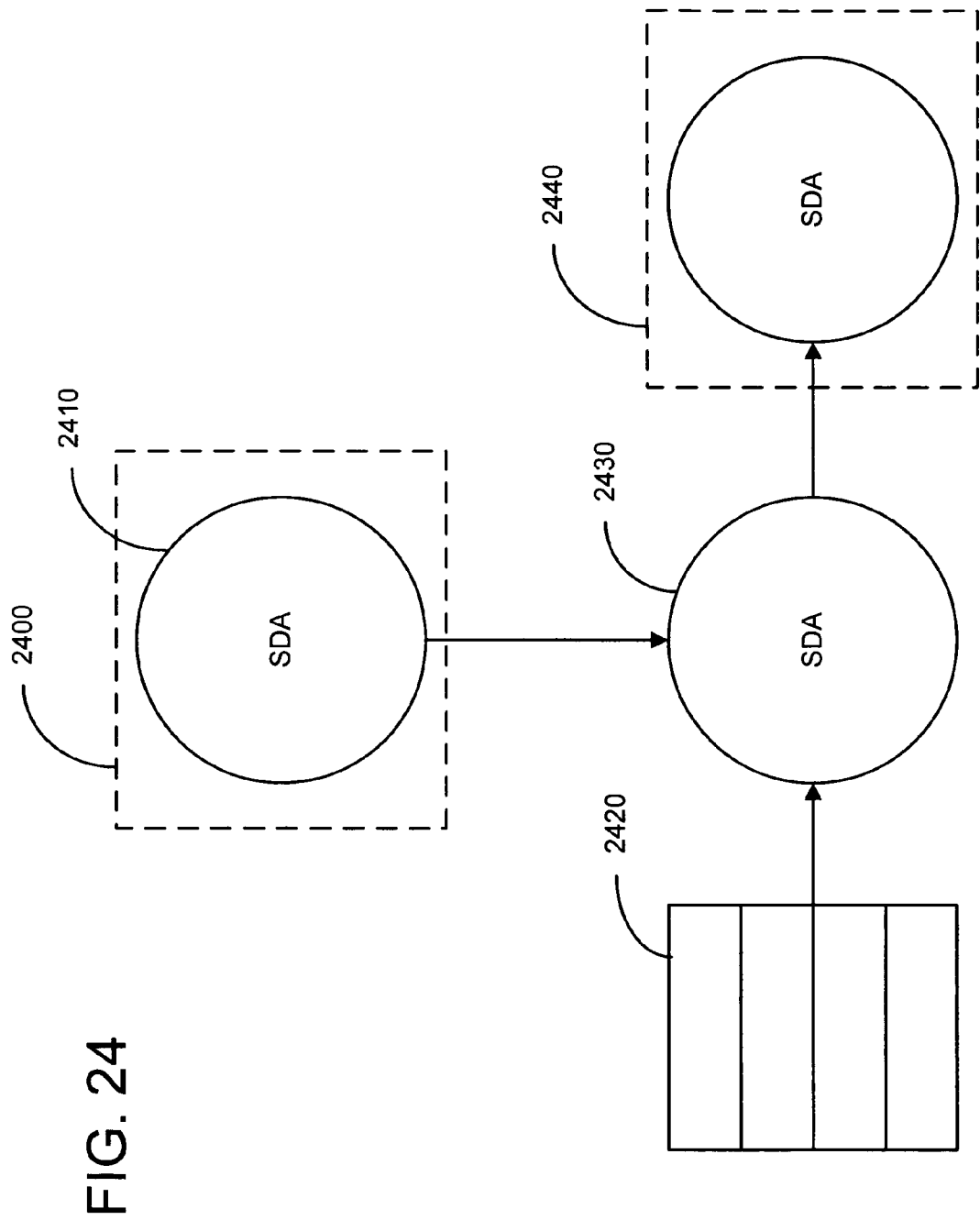
FIG. 24 illustrates creating inter-compatible software tools from an SDA.

In yet another embodiment, inter-compatible software tools can be created using an SDA. FIG. 24 is a block diagram of a first software development tool 2400 produced using an SDA 2410. One or more new components 2420 comprising functionality of a second software tool can then be created and linked to the SDA in a binary or other executable format 2430 to form a second software development tool 2440. The first and second software tools 2400/2440 are inter-compatible due to the fact that they share the characteristics (such as a common IR) of the SDA.

Exemplary Extensibility of IR Format

Because the core classes defined for the SDA can be extended, the IR format itself can be extended. For example, new class members can be added to a core class and be represented in the IR format. Such an arrangement can be beneficial for purposes of scalability. For example, it may be desirable to use lightweight data structures for a JIT compiler (e.g., for performance reasons). On the other hand, more comprehensive data structures may be appropriate for a whole program optimizing compiler.

The core classes can be extended via the object description language mechanism described herein. Thus, the core classes can be extended either at development time or at run time of the appropriate software component or tool (e.g., without access to the source code for the core classes). In this way, the system can support run time extensibility of the IR format.

Exemplary Software Development Scenario Independence

Software development scenario independence can be exhibited in a variety of ways. For example, independence with respect to one or more software development scenarios. For example, an implementation can be independent of programming language (e.g., input language), software execution architecture (e.g., processor or virtual machine), exception handling model, managed code scenario, and the like, or any combination thereof.

Exemplary Operating Environment

Figure 25:
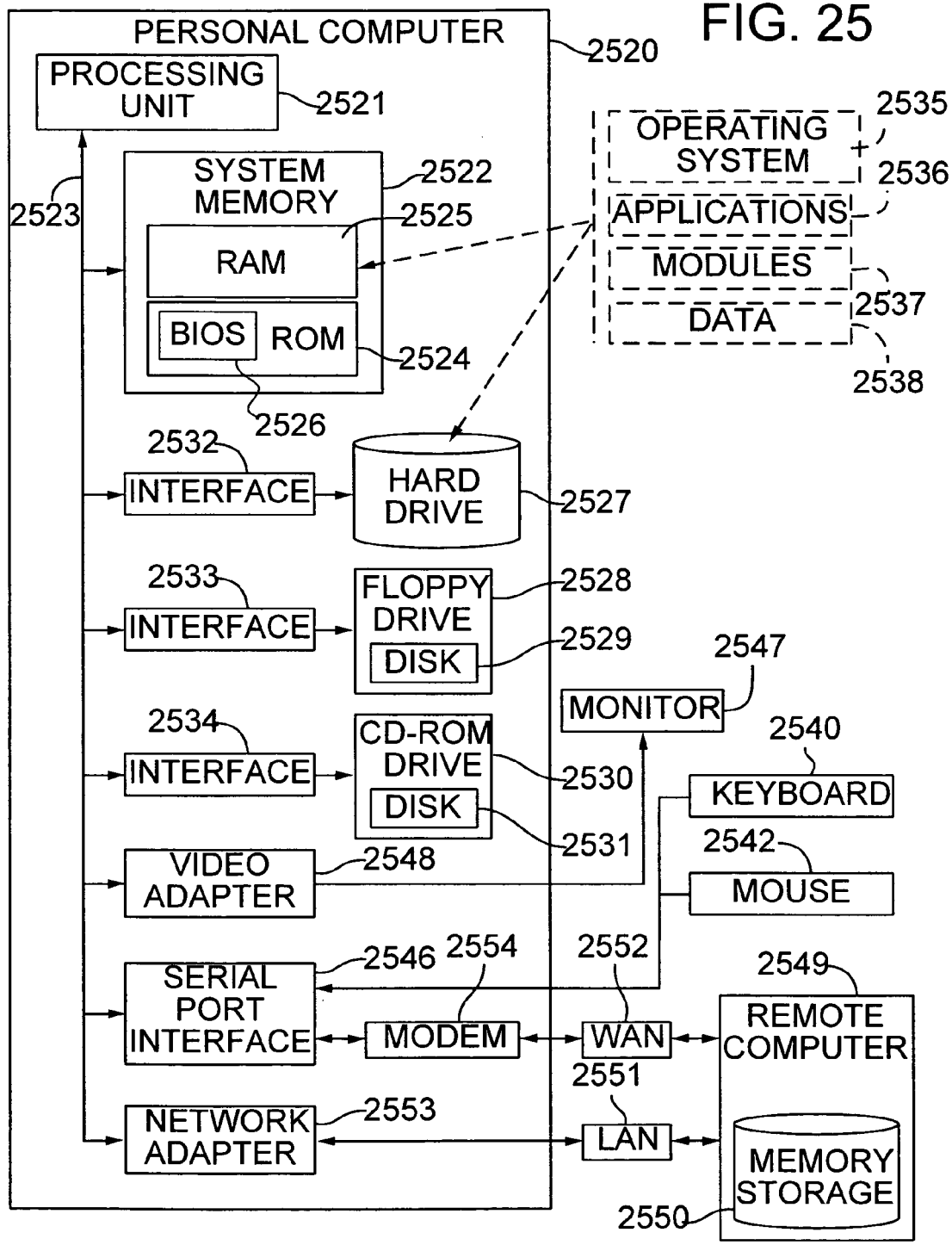
FIG. 25 illustrates an example of a computer system that serves as an operating environment for an embodiment of an SDA.

FIG. 25 illustrates an example of a computer system that serves as an operating environment for an embodiment of an SDA. The computer system includes a personal computer 2520, including a processing unit 2521, a system memory 2522, and a system bus 2523 that interconnects various system components including the system memory to the processing unit 2521. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 2524 and random access memory (RAM) 2525. A basic input/output system 2526 (BIOS), containing the basic routines that help to transfer information between elements within the personal computer 2520, such as during start-up, is stored in ROM 2524. The personal computer 2520 further includes a hard disk drive 2527, a magnetic disk drive 2528, e.g., to read from or write to a removable disk 2529, and an optical disk drive 2530, e.g., for reading a CD-ROM disk 2531 or to read from or write to other optical media. The hard disk drive 2527, magnetic disk drive 2528, and optical disk drive 2530 are connected to the system bus 2523 by a hard disk drive interface 2532, a magnetic disk drive interface 2533, and an optical drive interface 2534, respectively. The drives and their associated computer-readable media provide nonvolatile storage of data, data structures, computer-executable instructions (program code such as dynamic link libraries, and executable files), etc. for the personal computer 2520. Although the description of computer-readable media above refers to a hard disk, a removable magnetic disk and a CD, it can also include other types of media that are readable by a computer, such as magnetic cassettes, flash memory cards; digital video disks, Bernoulli cartridges, and the like.

A number of program modules may be stored in the drives and RAM 2525, including an operating system 2535, one or more application programs 2536, other program modules 2537, and program data 2538. A user may enter commands and information into the personal computer 2520 through a keyboard 2540 and pointing device, such as a mouse 2542. Other input devices (not shown) may include a microphone, joystick, game pad, satellite dish, scanner, or the like. These and other input devices are often connected to the processing unit 2521 through a serial port interface 2546 that is coupled to the system bus, but may be connected by other interfaces, such as a parallel port, game port or a universal serial bus (USB). A monitor 2547 or other type of display device is also connected to the system bus 2523 via an interface, such as a display controller or video adapter 2548. In addition to the monitor, personal computers typically include other peripheral output devices (not shown), such as speakers and printers.

The personal computer 2520 may operate in a networked environment using logical connections to one or more remote computers, such as a remote computer 2549. The remote computer 2549 may be a server, a router, a peer device or other common network node, and typically includes many or all of the elements described relative to the personal computer 2520, although only a memory storage device 2550 has been illustrated in FIG. 25. The logical connections depicted in FIG. 25 include a local area network (LAN) 2551 and a wide area network (WAN) 2552. Such networking environments are commonplace in offices, enterprise-wide computer networks, intranets and the Internet.

When used in a LAN networking environment, the personal computer 2520 is connected to the local network 2551 through a network interface or adapter 2553. When used in a WAN networking environment, the personal computer 2520 typically includes a modem 2554 or other means for establishing communications over the wide area network 2552, such as the Internet. The modem 2554, which may be internal or external, is connected to the system bus 2523 via the serial port interface 2546. In a networked environment, program modules depicted relative to the personal computer 2520, or portions thereof, may be stored in the remote memory storage device. The network connections shown are merely examples and other means of establishing a communications link between the computers may be used.

Alternatives

Having illustrated and described the principles of the illustrated embodiments, it will be apparent to those skilled in the art that the embodiments can be modified in arrangement and detail without departing from such principles.

In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

We claim:

1. One or more computer-readable media with computer-executable instructions for implementing a software development architecture comprising:
   a software development scenario-independent intermediate representation format;
   one or more exception handling models operable to support a plurality of programming language specific exception handling models for a plurality of different source languages;
   a type system operable to represent the type representations of the plurality of different source languages; and
   a code generator operable to generate code targeted for a plurality of execution architectures;
   wherein the code generator constructs one or more software development components of a plurality of different software development tools using the software development scenario-independent intermediate representation format, the one or more exception handling models operable to support the plurality of programming language specific exception handling models for the plurality of different source languages, and the type system operable to represent the plurality of different source languages;
   wherein the code generator further integrates the one or more software development components of the plurality of different software development tools into a software development scenario-independent framework; and
   wherein the code generator further creates the plurality of different software development tools by compiling the one or more software development components and the software development scenario-independent framework.

2. The one or more computer-readable media of claim 1 wherein the architecture is scalable to produce target software development tools ranging from lightweight just-in-time (JIT) compilers to whole program optimizing compilers.

3. The one or more computer-readable media of claim 1 wherein the architecture can be configured to produce a target software development tool with varying ranges of memory footprint, compilation speed, and optimization.

4. The one or more computer-readable media of claim 1 wherein the software development architecture is operable to produce a software development tool modifiable by combining a modification component with the software development scenario-independent framework.

5. The one or more computer-readable media of claim 1 wherein the software development architecture is operable to produce a software development tool by dynamically linking a binary version of the software development scenario-independent framework to a modification component.

6. The one or more computer-readable media of claim 1 wherein the intermediate representation format is extensible at runtime of a software tool employing the intermediate representation format.

7. The one or more computer-readable media of claim 1 wherein the architecture is combinable with the one or more software development components.

8. The one or more computer-readable media of claim 7 wherein the one or more software development components comprise data describing a target software development tool.

9. The one or more computer-readable media of claim 7 wherein the one or more software development components provides target execution architecture data to the code generator.

10. The one or more computer-readable media of claim 7 wherein the one or more software development components provide one or more type-checking rules to the type system.

11. The one or more computer-readable media of claim 7 wherein one or more software development components provide a set of class extension declarations to the architecture.

12. The one or more computer-readable media of claim 7 wherein the plurality of different software development tools comprises a native compiler.

13. The one or more computer-readable media of claim 7 wherein the plurality of different software development tools comprises a JIT compiler.

14. A method of creating a plurality of different target software development tools, the method comprising:
   receiving at least one computer-readable specification specifying functionality specific to one or more software development scenarios, wherein the at least one computer-readable specification specifies the following software development scenario functionality of the plurality of different target software development tools:
  target processor execution architecture;
  type checking rule set;
  managed execution environment;
  input programming language or input binary format; and
  compilation type;
creating at least one software development component for the plurality of different software development tools from the at least one specification;
integrating the at least one software development component for the plurality of different software development tools into a software development scenario-independent framework; and
compiling, at least in part, the at least one software development component and framework to create the plurality of different target software development tools;
wherein the computer-readable specification comprises functionality for processing an intermediate representation format capable of representing a plurality of different programming languages; and
wherein the intermediate representation format comprises one or more exception handling models capable of supporting a plurality of programming language-specific exception handling models for the plurality of different programming languages.

15. The method of claim 14 wherein software development components created from a plurality of computer-readable specifications for a plurality of respective software development scenarios are integrated into the framework.

16. The method of claim 14 wherein the computer-readable specification comprises one or more rulesets for type-checking one or more languages.

17. The method of claim 14 wherein the computer-readable specification comprises a set of class extension declarations specific to one or more of the software development scenarios.

18. The method of claim 14 wherein the intermediate representation comprises type representations capable of representing the type representations of the plurality of different programming languages.

19. The method of claim 14 further comprising:
  integrating custom code specific to one of the software development scenarios.

20. The method of claim 14 wherein the plurality of different software development tools comprises at least two of the group consisting of: a native compiler, a JIT compiler, an analysis tool, and a compiler development kit (CDK).

21. The method of claim 14 wherein the computer-readable specification specifies functionality of one of the group consisting of: a Pre-JIT compiler functionality, optimizer functionality, and defect detection tool functionality.

22. One or more computer-readable media containing one or more computer-executable instructions for performing the method of claim 14.

23. A method of creating a plurality of different target software development tools from a common framework, the method comprising:
  configuring the common framework based on one or more characteristics of the plurality of different target software development tools;
  creating software development components comprising one or more characteristics of the plurality of different target software development tools from the common framework;
  integrating the software development components into a software development scenario-independent framework; and
  creating the plurality of different target software development tools by compiling the software development components and the software development scenario-independent framework;
  wherein the one or more characteristics comprises an input language chosen from a plurality of different programming languages supported by the common framework for the plurality of different target software development tools; and
  wherein the common framework comprises exception handling models capable of supporting a plurality of programming language-specific exception handling models for the plurality of different programming languages.

24. The method of claim 23 wherein the one or more characteristics can further comprise the amount of memory necessary for the plurality of different target software development tools to execute on a target architecture, the speed at which the plurality of different target software development tools will execute on a target architecture, a input binary format for the plurality of different target software development tools, or the target architecture for the plurality of different target software development tools.

25. A method of producing a plurality of different inter-compatible software development tools, the method comprising:
  receiving a software development architecture that is operable to support a plurality of different programming languages, wherein the software development architecture further comprises:
    classes that are extensible through a set of declarations;
    functionality for an intermediate representation format used by both the first and second software development tools; and
    functionality for a type system used by both the first and second software development tools;
  creating software development components for the plurality of different software development tools from the software development architecture;
  creating a first software development tool by integrating the software development components into a
  software development scenario-independent framework and compiling the software development components and the software development scenario-independent framework; and
  creating a second different software development tool based on the first software development tool and the software development components, wherein the second software development tool dynamically links to a binary version of the software development scenario-independent framework;
  wherein the software development architecture comprises functionality for exception handling models operable to support programming-language specific exception handling models for the plurality of different programming languages, and the software development architecture is used by both the first and second software development tools.

26. A method of creating a plurality of different software development tools, the method comprising:
  receiving at least one computer-executable file comprising:
    an intermediate representation capable of representing a plurality of different programming languages and computer executable images;

one or more exception handling models capable of supporting a plurality of programming language specific exception handling models for the plurality of different programming languages;

a type system capable of representing the type representations of a plurality of source languages; and a code generator capable of generating code targeted for a plurality of execution architectures;

creating one or more software development components of a plurality of different software development tools from the at least one computer-executable file;

integrating the one or more software development components of the plurality of different software development tools into a software development scenario-independent framework using at least one class extension declaration; and creating the plurality of different software development tools by compiling, at least in part, the linked one or more software development components and the software development scenario-independent framework.

* * * * *